(12) United States Patent
Mulqueen et al.

(10) Patent No.: US 12,258,521 B2
(45) Date of Patent: *Mar. 25, 2025

(54) CATALYTIC CONVERSION OF CARBONACEOUS FEEDSTOCK MATERIAL INTO A BIOCHAR PRODUCT

(71) Applicant: Applied Carbon, Inc., Walnut, CA (US)

(72) Inventors: Daniel Mulqueen, Charleston, SC (US); Morgan Williams, Fruita, CO (US)

(73) Assignee: Applied Carbon, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,043

(22) Filed: May 9, 2024

(65) Prior Publication Data
US 2024/0318082 A1    Sep. 26, 2024

Related U.S. Application Data

(63) Continuation of application No. 18/206,578, filed on Jun. 6, 2023, now Pat. No. 12,037,547.

(60) Provisional application No. 63/349,552, filed on Jun. 6, 2022, provisional application No. 63/349,553, filed on Jun. 6, 2022.

(51) Int. Cl.
*C10B 53/02* (2006.01)
*C10B 7/06* (2006.01)
*C10B 57/12* (2006.01)

(52) U.S. Cl.
CPC ........... *C10B 53/02* (2013.01); *C10B 7/06* (2013.01); *C10B 57/12* (2013.01)

(58) Field of Classification Search
CPC ........... C10B 53/02; C10B 7/06; C10B 57/12
See application file for complete search history.

(56) References Cited

U.S. PATENT DOCUMENTS

| | | |
|---|---|---|
| 9,062,264 B2 | 6/2015 | Ramirez Corredores et al. |
| 10,252,951 B2 | 4/2019 | Bontchev et al. |
| 11,066,616 B1 | 7/2021 | Lu et al. |
| 11,168,339 B1 | 11/2021 | Stepany et al. |

(Continued)

FOREIGN PATENT DOCUMENTS

| | | | |
|---|---|---|---|
| CA | 3145542 A1 | 1/2021 | |
| GB | 2533081 A * | 6/2016 | ............. A01N 37/44 |

(Continued)

OTHER PUBLICATIONS

International Search Report and Written Opinion of the International Search Authority in international application No. PCT/US23/24611, mailed Sep. 19, 2023.

*Primary Examiner* — Wayne A Langel
(74) *Attorney, Agent, or Firm* — Cognition IP, P.C.; Edward Steakley

(57) ABSTRACT

Systems, methods and apparatus for the thermal conversion of carbonaceous feedstock material into biochar. The carbonaceous feedstock material may be harvested, preprocessed and pyrolyzed. An amount of carbonaceous feedstock material is received. An amount of a catalyst is applied to the carbonaceous feedstock material. The carbonaceous feedstock material and the applied catalyst is heated in an anaerobic environment to a temperature of at least 300 C. The biochar material is then generated.

11 Claims, 16 Drawing Sheets

(56) References Cited

U.S. PATENT DOCUMENTS

| | | |
|---|---|---|
| 12,037,547 B2 * | 7/2024 | Mulqueen ............... C05F 11/02 |
| 2014/0162873 A1 | 6/2014 | Gu |
| 2015/0128672 A1 | 5/2015 | Shearer et al. |
| 2015/0299086 A1 | 10/2015 | Farha et al. |

FOREIGN PATENT DOCUMENTS

| | | | |
|---|---|---|---|
| WO | 2015171570 A1 | 11/2015 | |
| WO | 2015171865 A1 | 11/2015 | |
| WO | 2021258077 A1 | 12/2021 | |
| WO | WO-2024110896 A1 * | 5/2024 | ......... B01D 53/1475 |

* cited by examiner

800

CATALYTIC CONVERSION OF CARBONACEOUS FEEDSTOCK MATERIAL INTO A BIOCHAR PRODUCT

CROSS-REFERENCE TO RELATED APPLICATIONS

This application is a continuation of U.S. patent application Ser. No. 18/206,578, filed on Jun. 6, 2023, which claims the benefit of U.S. Provisional Patent Application No. 63/349,552, filed on Jun. 6, 2022, and U.S. Provisional Patent Application No. 63/349,553, filed on Jun. 6, 2022, which are hereby incorporated by reference in their entirety.

FIELD OF INVENTION

This subject invention relates to conversion of biomass into biochar, and more particularly using catalyst prior to the thermal conversion of biomass into biochar.

SUMMARY

The thermal conversion of biomass into charcoal or biochar is known as pyrolysis. During pyrolysis, biomass feedstock is heated to temperatures in excess of 300 degrees Centigrade under restricted oxygen conditions, resulting in the thermal decomposition of the biomass. Pyrolysis of biomass generates flammable, gaseous byproducts (pyrolysis gas), liquid byproducts (pyrolysis oils) and solid products (biochar). The ratio of each product is determined by the temperature and oxygen concentration of the pyrolysis oven, and the amount of time the biomass feedstock is exposed to pyrolysis conditions (residence time).

Production of biochar is of particular interest to agriculture due to a number of beneficial soil amendment properties. When added to soil, biochar increases carbon concentration, which results in improved water holding capacity, nutrient retention and aeration. Biochar also impacts the chemical composition of the soil by increasing soil pH, and increasing cation exchange capacity. Changes in soil properties as a result of biochar application may increase crop yield and/or reduce input requirements (fertilizer, water etc).

Biochar is also interesting as a means to sequester atmospheric carbon and reduce the impact of global climate change. When waste biomass is thermally converted to biochar, a significant portion of the carbon content of the feedstock is converted to a mineral form of carbon. In its mineral form, carbon is not readily decomposed. When this mineral carbon is added to soils, it can be safely sequestered for many years. It is estimated that one tonne of biochar is equivalent to more than 3 tons of carbon-dioxide equivalent (CO2e), based on the molecular weight of carbon dioxide. Large-scale production of biochar from agricultural waste biomass has the potential to sequester vast amounts of atmospheric CO2e.

A key challenge associated with scaling up biochar production globally is the availability of biomass waste feedstock in sufficient quantities, and the costs associated with collecting these feedstocks for thermal conversion. Similarly, another challenge is the cost of redistributing the biochar to the soil across many acres of farmland. Finally, the high cost of building a large, centralized, biochar plant is often prohibitive to rapid growth of producers.

SUMMARY

Described herein are exemplary methods of thermal conversion of carbonaceous feedstock material (e.g., biomass material) into biochar. Some of these methods include using a catalyst or combination of catalysts to direct the decomposition pathways or carbonaceous feedstock material in order to produce an engineered carbon product.

In some embodiments, systems, methods and apparatus for the thermal conversion of carbonaceous feedstock material into biochar. The carbonaceous feedstock material may be harvested, preprocessed and pyrolyzed. An amount of carbonaceous feedstock material is received. An amount of a catalyst is applied to the carbonaceous feedstock material. The carbonaceous feedstock material and the applied catalyst is heated in an anaerobic environment to a temperature of at least 300 C. The biochar material is then generated.

Furthermore, the appended claims may serve as a summary of this application.

DETAILED DESCRIPTION OF THE DRAWINGS

Figure 1:
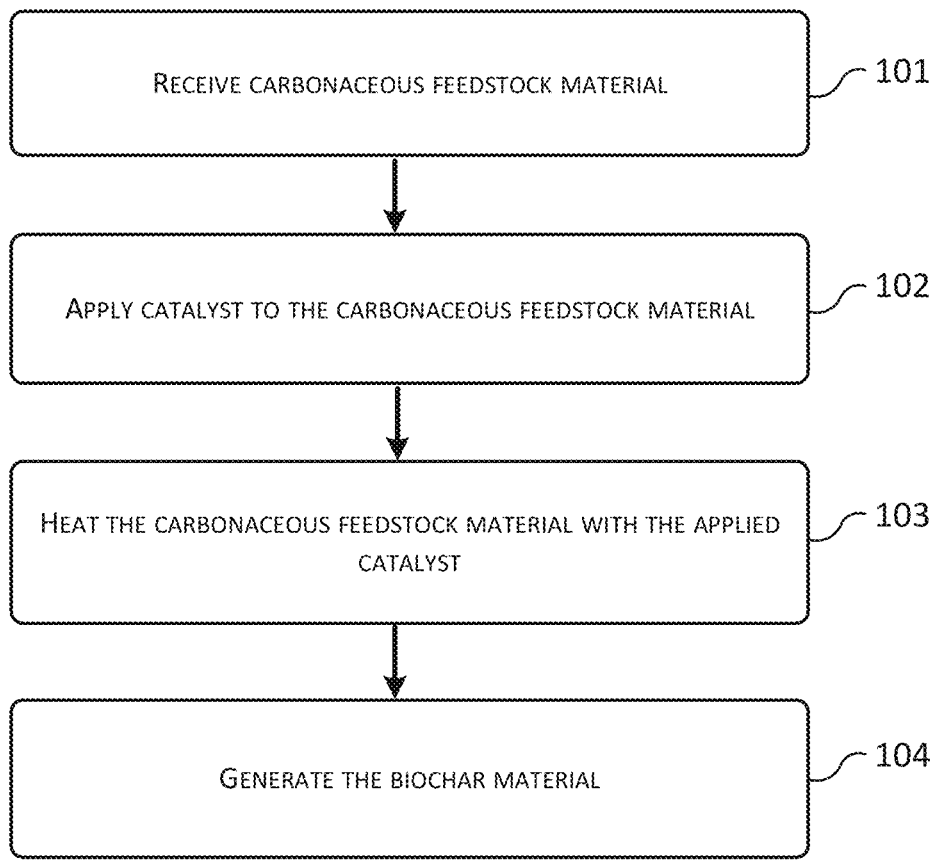
FIG. 1 is a flow chart illustrating an exemplary method 100 that may be performed in some embodiments.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

To facilitate review of the various embodiments of this disclosure, the following explanations of specific terms are provided:

Agronomic Properties of Biochar: A collection of properties that result in greater plant growth, including (but not limited to), cation exchange capacity, pH buffering capacity, plant availability of macro and micro nutrients, stable surface area for the colonization of beneficial microorganisms, reduction in premature macro and micro nutrient leaching, soil water holding capacity, and soil aggregation.

Alkali and Alkaline Earth Metals (AAEMs): Elements in groups one and two of the periodic table including Li, Na, K, Rb, Cs, and Fr (group one), and Be, Mg, Ca, Sr, Ba and Ra (group two).

Amorphous Carbons: Carbon materials without significant hybrid aromatic bonding.

Biochar: The solid carbon fraction, which also contains the mineral ash, produced through the pyrolysis of carbonaceous feedstock material.

Carbon Nano-Material: A material composed of carbon atoms with few or no impurities.

Carbon Nano-Powder: Bulk carbon nano-material particles.

Graphene: A highly aromatized carbon structure, consisting of sheets of interconnected aromatic rings, larger and more complicated than polycyclic aromatic hydrocarbons.

Graphenes: The term for a collection of different types of graphene, or of graphene materials with different properties.

Graphite: A carbon mineral consisting of layered sheets of aromatic carbons.

Mineral Ash: A fraction of the solid by-product of pyrolysis rich in AAEMs.

Pyrolysis: The thermal decomposition of materials at elevated temperatures in an inert atmosphere resulting in changes to the chemical composition of materials.

Recalcitrant: The stable carbon fraction that is resistant to decomposition.

Soil Minerals: Groups of primary (e.g., feldspars, micas, quartz) and secondary (e.g., clays including illite, smectite, kaolinite, chlorite) minerals rich in Ca, Na, Si, K, Mg, Fe, Mn, Al, commonly found in soils.

Syngas: The non-condensable fraction of volatile carbons produced through pyrolysis of carbonaceous feedstock material.

Tars: The condensable fraction of volatile carbons produced through pyrolysis of carbonaceous feedstock material.

FIG. 1 is a flow chart illustrating an exemplary method that may be performed in some embodiments. A method of converting a carbonaceous feedstock material into a biochar material is described with regard to the method 100.

In step 101, an amount of carbonaceous feedstock material is collected and/or received.

In step 102, an amount of a catalyst to the carbonaceous feedstock material. In various embodiments, catalyst(s) may be applied to carbonaceous feedstock material prior to heating the carbonaceous feedstock material. For example, phosphoric acid, iron and similar transition metals and/or the use of recovered biomass ash naturally rich in alkaline earth metals may be applied to a carbonaceous feedstock material which then is heated in the next step to convert the treated carbonaceous feedstock material into a biochar product.

In step 103, the carbonaceous feedstock material and the applied catalyst are heated in an anaerobic environment to a temperature of at least 300 C.

In step 104, biochar material is generated.

Phosphoric Acid as a Catalyst

In some embodiments, phosphoric acid may be used as a catalyst to produce biochars from a carbonaceous precursor. During the pyrolysis process, the phosphoric acid reacts with the carbon in the precursor material (e.g., carbonaceous feedstock material), creating a network of pores and channels within the carbon structure.

Phosphoric acid may be used in the production of biochars in catalyzing pyrolysis and increasing porosity and surface area. Further, the phosphoric acid separates cellulose fibers and partially depolymerizes the lignin matrix, increasing the elasticity of biomass. The dehydration caused by phosphoric acid, which removes oxygen and hydrogen from the feedstock, leads to an increased production of reactive, aromatic products which can cross-link in the presence of phosphates. The evolution of pore volume in biomass with the use of phosphoric acid has been most significant at acid:biomass of greater than 1:1, and at ratios below 0.5:1 show little change in porosity compared to untreated biomass, and as such treatment at lower ratios has not been a focus of investigation, however yield is maximized at 0.09:1, with yields of 40% as compared to ~27% for untreated biomass.

The use of phosphoric acid at low levels offers several distinct benefits to carbon production which are utilized in this invention. The increase in carbon yield with phosphoric acid improves the economics of any solid carbon production by increasing product yield and reducing the volume of waste gasses. Removal of oxygen through dehydration increases the durability of the carbon as a carbon sequestration agent as measured by metrics including, but not limited to, elemental Oxygen-to-Carbon or Hydrogen-to-Carbon ratios. The creation of reactive, aromatic carbon groups beneficial in the production of high value graphitic carbons, such as graphene nanoplatelets as outlined below.

The amount of phosphoric acid used in the activation process can vary depending on several factors, including the type of precursor material, the desired properties of the biochar, and the specific pyrolysis process being used. Optimal phosphoric acid weight ratios will be between 1:100 to 1:3 of acid:feedstock to maximize the solid yield of biochar or the yield of solid. carbon from the feedstock material. Application of phosphoric acid to the carbonaceous feedstock material changes the decomposition pathways of the carbonaceous feedstock material by acting as a dehydrating agent and promoting the formation of intermediate compounds that can lead to the formation of solid carbon structures.

When the carbonaceous feedstock material is heated in the presence of phosphoric acid, the acid reacts with the hydrogen and oxygen present in the biomass. This causes the removal of water molecules and the formation of anhydrous carbon intermediates. The anhydrous carbon intermediates undergo further reactions, leading to the formation of a high purity carbon structure. In addition to promoting the formation of solid carbon, phosphoric acid can also influence the overall composition of the final product. For example, the acid can react with certain functional groups in the biomass, leading to the removal of impurities and the creation of a more homogeneous carbon structure as measured by X-ray Photon Spectroscopy (XPS), Nuclear Magnetic Resonance (NMR), Solid-State Cross-Polarization Magic Angle Spinning Carbon-13 Nuclear Magnetic Resonance (CP/MAS 13C-NMR), or optical anisotropy.

The use of phosphoric acid in the carbonization process provides a controlled and efficient method for producing carbon from biomass. However, the specific effects of phosphoric acid on the decomposition pathways of biomass will depend on various factors such as the type of biomass, the concentration of acid used, and the activation temperature and time.

Iron/Transition Metals as a Catalyst

Iron and similar transition metals can be used as a catalyst agent to affect the decomposition pathways of biomass by promoting specific chemical reactions that break down the biomass into intermediate products. Iron catalysts may be used in the process of pyrolysis, which involves heating biomass in the absence of oxygen to produce bio-oil, biochar, and gas products. During the pyrolysis process, iron catalysts promote the decomposition of the biomass through a series of complex chemical reactions. The iron catalysts activate certain functional groups in the biomass, leading to the formation of free radicals and intermediate compounds. In addition to promoting the decomposition of the biomass, iron catalysts can also affect the composition of the final product.

The specific effects of iron catalysts on the decomposition pathways of biomass depend on various factors such as the type of biomass, the concentration of catalyst used, the reaction temperature and time, and the nature of the catalyst surface. Iron catalysts are effective at promoting sp2 functionalization in a variety of carbon-based materials. Examples include:

Iron nanoparticles are effective at promoting sp2 functionalization in carbon nanotubes. The iron nanoparticles activate the carbon nanotubes and facilitate the formation of double bonds between carbon atoms, resulting in the formation of conjugated systems.

Iron phthalocyanine is a metal-organic compound that may be used as a catalyst for the functionalization of graphene. The iron phthalocyanine activates certain functional groups on the graphene surface, leading to the formation of free radicals and intermediate compounds that can undergo further reactions to form sp2-functionalized products.

Iron oxide nanoparticles may be used as a catalyst for the functionalization of carbon materials such as activated carbon and graphene oxide. The iron oxide nanoparticles can promote the formation of double bonds and the creation of conjugated systems in the carbon materials, resulting in improved electronic and catalytic properties.

Iron catalysts can promote sp2 functionalization in carbons over sp3 because sp2 functionalization involves the formation of double bonds between carbon atoms, which results in the creation of conjugated systems and the formation of aromatic rings. These reactions typically require high temperatures (over 1400 C) and the presence of a catalyst to proceed efficiently. Iron catalysts can promote sp2 functionalization by facilitating the formation of double bonds and promoting the rearrangement of carbon atoms to form conjugated systems. In particular, iron catalysts can activate certain functional groups in the carbon material, leading to the formation of free radicals and intermediate compounds that can undergo further reactions to form sp2-functionalized products. The specific effects of iron catalysts on the sp2 functionalization of carbons will depend on various factors such as the type of carbon material, the reaction conditions, and the nature of the iron catalyst. However, in general, iron catalysts have been shown to be effective at promoting sp2 functionalization in carbons and have been used in a variety of applications such as the production of carbon-based catalysts and electronic materials.

In some embodiments, to distribute metal atoms efficiently in the feedstock, one may use a soluble metal compound over a metal nanoparticle, from both a cost and efficiency standpoint. There are a wide variety of soluble metal compounds which will work, specific to the solvent used to distribute the metal catalyst in the feedstock. For biomass feedstocks, water is the preferred solvent and transition metal salts are the most obvious catalyst. A wide range of metal salts exist which are highly soluble in water, in order to minimize the volume of water needed. Iron (III) nitrate, $Fe(NO_3)_3$, is the preferred salt for several reasons. First, the hexahydrate of iron (III) nitrate is soluble in water at 1500 g/L. Second, the decomposition of $Fe(NO_3)_3$ does not produce any hazardous pollutants from sulfur, halogens, or similar compounds. Third, $Fe(NO_3)_3$ is easily recoverable from the carbonized product, either directly using nitric acid, or through an intermediate process using hydrochloric acid as an intermediate.

Iron (III) chloride ($FeCl_3$) is similarly soluble in water, and is easily recoverable in HCl from a produced carbon, but the chlorine is hazardous during pyrolysis, as it will react to form compounds which are both highly corrosive and hazardous pollutants. Iron(III) sulfide ($Fe_2S_3$) is not highly soluble in water and Iron(III) acetate is not soluble in water, but is soluble in alcohol. Iron(II) nitrate ($Fe(NO_3)_2$) works equally well as a source of metal ions, but is not commercially available due to instability in air.

Rare Earth, Alkaline Metals and Recovered Ash as a Catalyst

Lignocellulosic biomass is made up, predominantly, of the organic polymers, cellulose, hemicellulose, and lignin. When heated sufficiently, these polymers break down into a combination of smaller, volatile hydrocarbons and amorphous, sp3 bonded solid carbon. The non-condensable fraction of these volatile carbons is referred to herein as, "Syngas." The condensable fraction of these volatile carbons is referred to herein as, "Tars." The solid carbon fraction, which also contains the mineral ash from biomass, is referred to herein as "Biochar." The relative mass fractions of these three components vary substantially depending on feedstock, the heating rate, and the temperature of pyrolysis. Higher pyrolysis temperatures have given lower solid yields and more complete volatilization while faster heating rates have given greater tar yields and lower heating rates favored solid and gas production. Recently, investigations into the role of metals on biomass carbonization have shown that inorganic elements present in biomass ash (aka "mineral ash") or added to biomass prior to pyrolysis have a large impact on the relative mass fractions produced during pyrolysis.

Alkali and alkaline earth metals (AAEM) are abundant in lignocellulosic biomass. These minerals play important roles in determining how the carbon, hydrogen, and oxygen which make up the majority of biomass decompose when heated. The set of reactions which occur under heating are referred to herein as, "decomposition pathways." Other mineral components, such as silicon (Si) and transition metals like iron (Fe), Cobalt (Co) and Nickel (Ni) are also common and can play a large role in determining the decomposition pathways of biomass.

Magnesium and calcium has a role in the conversion of volatile carbons into solids, as well as the potential of Mg and Ca to form $MgO_3(CO_3)_2$ and $CaCO_3$ during pyrolysis, further sequestering carbons. In this case, a 1:5 ratio of mineral-chloride salts to biomass produced yield increases of 28.7%. A link between alkaline earth metals (AAEM), such as K, Na, Ca and Mg, content and increased solid carbon yields with some chemical models which influence decomposition paths. More complete chemical models have yet to be developed, and the range of catalytic effectiveness has not been determined. Further, much of the focus on past work has been on reducing mineral content to increase the production of tars and bio-oils, rather than increasing the solids yield.

A primary difficulty in implementing the catalyst enhanced production of biochar, as outlined above, is in the addition of the catalyst material in significant volume to impact yield. AAEM and transition metal salts represent an added cost to the carbonization process which can easily exceed the benefit provided by increased yields. This is made more difficult in mobile carbon production systems where large volumes of metal salts must be transported along with the pyrolysis equipment and collected if they are to be recycled. This represents a substantial logistical barrier.

The mineral ash component of biomass exists in two primary fractions; minerals which are integrated with the biomass structure as a result of biological activity (Na, P, K are examples), and minerals which have been physically entrained with the biomass as a result of adhesion or mixing (Si, Ca, Mg). The result of these two fractions results in two different processes for mineral ash collection. Physically bound mineral ash may be separated through mechanical action of either the input biomass or product biochar, such as sieving or washing or other methods available in the art. Mineral ash which is integrated into the chemical structure of the biomass remains integrated with the chemical structure of the product biochar and must be collected through either chemical separation or by oxidizing the carbon from the biochar, leaving the mineral ash component. The two distinct behaviors of these mineral ash fractions allow for a selection of mineral components from the ash to target catalytic properties for the process described herein. Additionally, there are elements which are not utilized in the organic activity of plant life, which may otherwise be accumulated from the environment, and which are commonly considered toxic or pollutants (As, Cd, Cu, Pb, Zn, and Hg). These may also have potential benefits as carbonization catalysts with the added effect of removing them from the environment through processing.

Wood derived mineral ash (wood-ash) may have a role in the conversion of volatile carbons into solids during pyrolysis. In this effort, a 50% wood-ash addition to wood chip biomass produced biochar yield increases of 80-90%. Bottom fly ash (derived from coal combustion) addition of 9% to wood chips may increase biochar yield by 26%. Both studies attributed improved yields to the presence of AAEM in ash, mainly potassium (K), sodium (Na), and calcium (Ca). To our knowledge, no work has been done on mineral ash addition to alter biochar properties from crop residues including corn stover, rice straw, cotton straw, wheat straw, sorghum stover, or other forages. Further, no efforts in past work have focused on the down-stream capture and up-stream re-injection of mineral ash in a closed loop, continuous pyrolysis system. Nor have any efforts been made to couple recaptured mineral ash with field collected soil minerals for the creation of a bio-mineral complex for alteration of biochar properties.

The minerals commonly found in agricultural soils can also serve a catalytic role in biochar formation, while also improving the agronomic benefit of biochar when re-applied to soil. Agricultural soils generally contain 20-30% water, 20-30% air, 5% organic matter, and 45% minerals. The exact composition of soil minerals greatly varies depending on underlying geology and weathering characteristics. In most soils, feldspars, micas, and quartz are the main primary mineral constituents, and pyroxenes and hornblendes are present in smaller amounts. Secondary minerals are largely produced through processes of soil formation through low-temperature aqueous reactions during the weathering of primary minerals. The resultant secondary minerals are generally clays and silts composed of Illite, Smectite, Kaolinite, or Chlorites, along with various complexes thereof. Both primary and secondary minerals are rich in Ca, Na, Si, K, Mg, Fe, Mn, Al, in addition to other minor elements.

The addition of kaolinite/bentonite-iron sulfate mineral to carbonaceous feedstock materials prior to pyrolysis of the carbonaceous feedstock materials can increase biochar yield by reducing tar formation, while also increasing the aromaticity of poly-cyclic carbon rings within biochar thereby increasing carbon stability. Clay coatings of kaolinite, bentonite, montmorillonite, and struvite can also alter pore size distribution and geometry, cation exchange capacity, pH buffering capacity, and microbial colonization with impacts to the efficacy and longevity of agronomic benefits. The addition of clay minerals has focused on large volumetric additions on a wt/wt % basis, in addition to long soak/treatment (hours-to-days), and subsequent long drying times prior to pyrolysis. Such practices are not viable in continuous process pyrolysis facilities, or in mobile systems that are located far from inputs. Furthermore, prior work has focused on the addition of relatively pure secondary minerals (e.g., clays and mineral salts), rather than abundant and easily accessible soil materials composed of mixtures of such minerals. To our knowledge, no work has been done on intentional soil addition to pyrolysis for alteration of biochar properties. Additionally, no efforts have been made to couple the addition of native collected soil to mineral ash for the creation of a bio-mineral complex for alteration of biochar properties.

Applying a Catalyst to Carbonaceous Feedstock Material

In some embodiments a feedstock, such as a carbonaceous feedstock material, is processed with a catalyst. The catalyst is distributed in the carbonaceous feedstock material. For example, the catalyst may be applied through the soaking of the carbonaceous feedstock material with the catalyst, by spraying the catalyst with the biomass and/or mixing the catalyst with the carbonaceous feedstock material. In some embodiments, the carbonaceous feedstock material may be pre-treated to enhance the permeability of a feedstock material to the catalyst.

In some embodiments, carbonaceous feedstock material may be sprayed or soaked with a catalyst. A wide range of methods are available for the distribution of metal catalysts into carbonaceous feedstock material, depending on processing rates, locations, and energy requirements. Any method of application which provides adequate distribution should be considered within the field of this invention. Several examples are listed below.

In some embodiments, to rapidly treat a large volume of material in a production setting, the spray application of a catalyst may be considered. A premixed, aqueous catalyst solution may be sprayed over feedstock in a conveyor as the feedstock is introduced to the process. Matching the rate of catalyst application to a metered conveyor rate will give correct dosing, and the use of a mixing conveyor will provide even distribution amongst feedstock particles. In this way, the catalyst may be evenly applied with a minimum use of water or other solvents, reducing the energy needed in drying. Allowing feedstock to rest in metering bins, already in use in the process, will give additional time for catalyst penetration.

In some embodiments, to provide the most effective distribution of catalyst, application by soaking may be used. Soaking the feedstock in a volume of concentrated solvent sufficient to completely immerse the feedstock will allow for significant distribution of catalyst ions. This can be done in a batch process, or in a continuous process.

In some embodiments, a variety of methods may be used to accelerate the penetration of the catalyst into the feedstock with spray, soaking, or other application. The application of vacuum to the feedstock/catalyst mixture will remove air from the biomass structure, allowing for more effective penetration of the catalyst mixture into the pore structure of the feedstock. This method is especially useful in dry and porous materials which may not absorb the catalyst liquid quickly. Alternately, the use of pressure may increase the flow of catalyst ions into a high moisture feedstock by overcoming osmotic pressure of cellular membranes and increasing the flow of ions into the biomass structure. This is especially useful for wet feedstocks or feedstocks which might have difficulty absorbing catalyst ions. Increasing the temperature during a spray or soaking stage (while remaining below drying temperatures) will increase thermodynamic movement of ions, allowing for more rapid dispersion of ions into the feedstock.

Post Processing of Carbonaceous Feedstock Material

In some embodiments, post processing may be performed to recover catalysts applied to the carbonaceous feedstock material. In certain applications, such as for the infield application of biochar, catalysts such as phosphorus and iron should be left in the product char, as a process of adding additional nutrients to the soil. The high surface area carbon structure of the char product enhances the bioavailability of these metals and is considered a key element of this invention.

For other applications, such as in the production of carbon nanoparticles, removal of the catalysts may be beneficial or economically necessary. In this case, metal groups are easily removable using any one of a number of acids. Phosphoric acid may be recovered by rinsing the product carbon with water, which will react with the phosphorous to produce phosphoric acid. Iron, or other transition metals may be reverted to a nitrate form through the use of nitric acid, which will form the metal salt directly. The use of another acid, such as hydrochloric acid may provide more effective catalyst removal, and the resultant iron (III) chloride may be converted into iron (III) nitrate though any available method, including precipitation using a hydroxide to convert iron (III) chloride into iron (III) hydroxide, and subsequently converting iron (III) hydroxide with nitric acid to produce iron (III) nitrate and water.

In some embodiments, post processing may be performed to provide milling and/or exfoliation. A turbostratic graphitic carbon has significantly more value when exfoliated into graphic nanoplatelets (pGNP). This can be accomplished through a number of methods which exist in the art, including chemical and thermal exfoliation. The most energy efficient and cost-effective processes of exfoliation to produce pGNP consists of exfoliation in a solvent using either mechanical high-shear mixing, ultrasonication, or a combination of the two. A broad range of solvents are acceptable, and while exotic solvents such as n-methyl-2-pyrrolidone (NMP), dimethyl sulfoxide (DMSO), and diethyl ether (DE) are viable, the unique, turbostratic nature of pGNP allows for effective use of more cost effective, environmentally friendly solvents such as water, alcohol, or acetone.

The addition of carboxymethyl cellulose (CMC), sodium dodecyl sulfate (SDS), or other compounds may aide in the exfoliation by altering the viscosity of the solvent or improving the dispersibility of pGNP in the solvent.

In some embodiments, post processing may be performed to provide suspension formulation. A wide range of solvents are available for the base of the suspension, with several properties that must be considered including cost, polarity, interactions with the prepreg, and health and safety. Water is the default choice since it is the lowest cost and most broadly available when compared to other solvents. Alcohols are widely used for the spray application of GNP, as well as acetone to a lesser extent, owing to their wide availability, relative inertness, and low cost. Acetone is soluble with epoxy resins and can degrade the resin quality but is useful for other applications. Exotic solvents such as N-Methyl-2-pyrrolidone (NMP) and Dimethyl sulfoxide (DMSO) are frequently used due to their ability to hold higher loadings of GNP in suspension but have significant drawbacks which must be considered. DMSO and NMP are significantly more expensive as compared to water and alcohol. DMSO has a low volatility and can interact with a wide range of chemicals, including epoxy resins and crosslinkers. NMP is highly volatile—which is useful for rapid drying—but has significant environmental health and safety risks that limit its use in many applications.

Other additives can be beneficial in formulating a suspension. Carboxymethyl cellulose (CMC) is a widely used viscosity modifier used to stabilize emulsions, and as a binder. Sodium dodecyl sulfate (SDS) is an anionic surfactant which is the sodium salt of a 12-carbon tail combined with a polar organosulfate headgroup. The alkyl chain lays along the pGNP surface while the polar head interacts with the solvent. CMC and SDS are both plant derived and have been shown to provide benefits to pGNP dispersion. Additionally, caprolactam was explored as a possible additive. Caprolactam is a precursor to the polymer Nylon 6, and in water hydrolyzes to aminocaproic acid, a compound with a 6-carbon chain and polar carboxyl headgroup which suggests similar behavior to SDS. Caprolactam has been used for in-situ polymerization of GNP nanocomposites. A wide range of additives not listed here can have similar effects to those listed and should be considered analogous for the sake of this invention.

In some embodiments, post processing may be performed to provide drying of the carbonaceous feedstock material. Drying of amorphous, hard carbons—as produced through pyrolysis or phosphoric acid catalyzed pyrolysis-do not require any special drying steps. Graphitic carbons, such as pGNP exhibit significant Van der Waals self-interaction, which can lead to aggregation when drying by normal methods. As a graphene suspension dries, particles stack in an orderly fashion, producing a material similar to graphite. This aspect of the drying process is useful in producing plant-based graphite materials-similar to synthetic graphite-which have uses in electrode manufacturing.

Drying in a manner which maintains the nanoplatelet structure of pGNP requires special methods. One such method is spray drying, where the pGNP is suspended in a solvent (as described above) which is sprayed as a fine mist into a dryer, allowing for particles to be isolated while drying, preventing agglomeration. The particles may be collected via a cyclone or baghouse for use as a final product.

Another method may be through direct spray application, such as an interlaminar coating for composite structures or as a surface coating. Such a method has been shown to deliver an even, well dispersed layer of nanoplatelets that has provided significant structural and multifunctional properties to composites. Spray application of pGNP of surfaces of glass fiber or carbon fiber reinforcements, as well as on preimpregnated fiber surfaces, presents an end product with significant improvement in interlaminar properties which is an end product within the scope of this invention.

Examples Using a Catalyst to Convert Carbonaceous Feedstock Material into Biochar The following examples describe the process of converting carbonaceous feedstock material into biochar using various catalysts being applied to the carbonaceous feedstock material.

Recovered Biomass Ash Example: One embodiment of the method of converting biomass into biochar is focused on the increase in solid carbon yields during pyrolysis through the addition of a recovered ash catalyst with biomass feedstock. A broad range of biomass feedstocks are usable, including wood, corn stover, rice straw, nut hulls, and food waste. Likewise, the most convenient source of ash is in the biomass being carbonized, but many other sources of ash exist, such as from biomass burners. A collection of fines from a pyrolysis process, such as from a cyclone or baghouse, can present a convenient source of ash for use.

Figure 2:
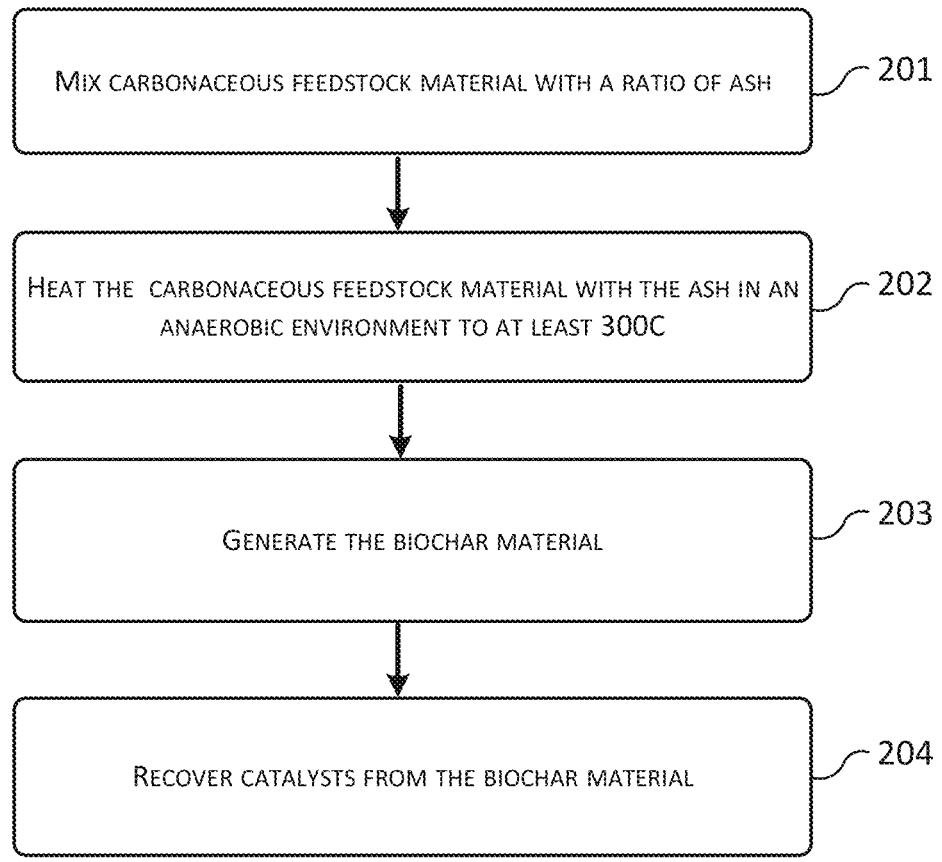
FIG. 2 is a flow chart illustrating an exemplary method 200 that may be performed in some embodiments.

FIG. 2 is a flow chart illustrating an exemplary method 200 that may be performed in some embodiments. The steps of processing are as follows:

In step 201, a mass of biomass is mixed with a ratio of ash from 1-50:100 ratio (1-50 units of dry ash for every 100 units of dry biomass). The ash may be mixed so that it is uniformly distributed amongst biomass particles. This mixing may be assisted with the addition of water, to facilitate the adhesion of ash particles to biomass particles and the transfer of water-soluble ash components into the biomass structure.

In step 202, the treated biomass is heated in an anaerobic environment to a temperature of at least 300 C, or a temperature comparable to the un-catalyzed process. This can be achieved through any of a number of means which exist commonly in the prior art, including with heated, inert or reducing sweep gas, with an externally heated reactor, or with a heated media reactor.

In step 203, the biochar material is generated. In some embodiments, the product material from step 202 is cooled to ambient temperature. At this stage, an amorphous, hard biomass carbon, containing excess ash has been produced and can be utilized as a final product for appropriate applications such as biochar.

In step 204, catalysts can be recovered from the carbon through either a physical separation, such as agitation or elutriation, in order to be recirculated back through the process to treat new, incoming biomass.

Use of ash recovered from corn stover at a 16:100 ratio to incoming stover, utilizing water to improve distribution, showed a 30% increase in MAF carbon yield over uncatalyzed pyrolysis. This ratio corresponds with recovering 100% of the ash in corn stover during a single cycle, or 50% of the ash in a continuous process.

Recovered Biomass Ash with Phosphoric Acid Example: One embodiment of a method of converting biomass into biochar is a modification to the prior above example and is focused on the use of an acid to improve the transfer of AAEM ions from recovered ash or carbon material into incoming carbonaceous feedstock material. The use of an acid to reduce and ionize AAEM, AAEM oxides, and other metal oxides can be beneficial in allowing better absorption of catalyst materials into incoming feedstock. Ash reduction can occur at several stages, while mixing the ash with incoming feedstock, prior to mixing the ash catalyst with incoming feedstock, or as a method of removing ash from a car output product. A wide variety of acids may be used, each with different benefits, but there is potential for significant synergy in using an acid which also benefits the pyrolysis process such as (but not limited to) phosphoric acid.

Use of ash recovered from corn stover at a 16:100 ratio to incoming stover, utilizing HCl to reduce the ash prior to mixing, showed a 31% increase in MAF carbon yield over ash recirculation with added water and a 70% increase in MAF carbon yield in uncatalyzed pyrolysis. At the same ratios, utilization of phosphoric acid showed an 81% increase in MAF carbon yield over ash recirculation with added water and a 135% increase in MAF carbon yield in uncatalyzed pyrolysis.

Phosphoric Acid Treatment, 600 C Example: One embodiment of a method of converting biomass into biochar is focused on the increase in solid carbon yields during pyrolysis through the addition of a phosphoric acid catalyst with biomass feedstock. A broad range of biomass feedstocks are usable, including wood, corn stover, rice straw, nut hulls, and food waste. All tested lignocellulosic biomass has been converted effectively; any carbonaceous feedstock material may be convertible in the field of this invention.

Figure 3:
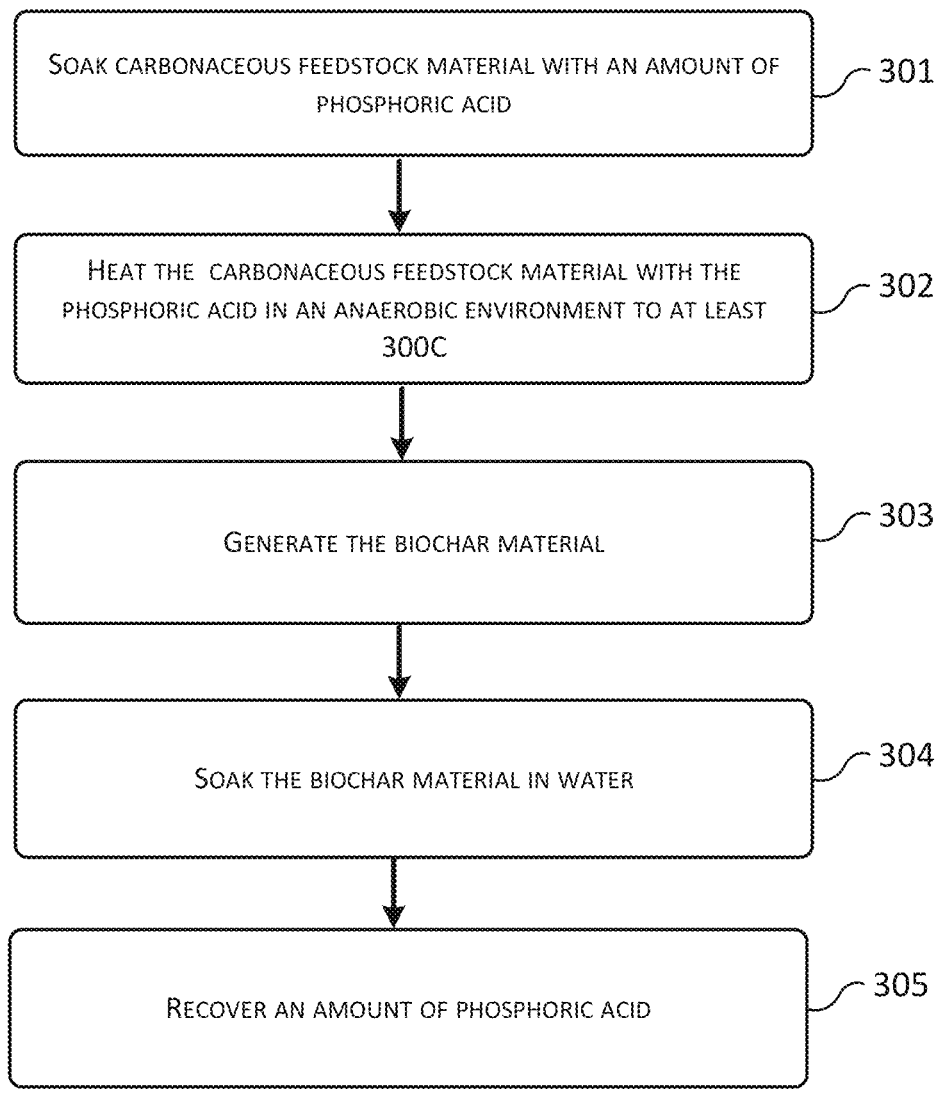
FIG. 3 is a flow chart illustrating an exemplary method 300 that may be performed in some embodiments.

FIG. 3 is a flow chart illustrating an exemplary method that may be performed in some embodiments. The method steps of processing are as follows:

In step 301, a mass of biomass is soaked in a solution of $H_3PO_4$, such that the biomass absorbs phosphorus at a 1:100 ratio (100 units of dry biomass for every one unit of phosphorus). When using $H_3PO_4$, the mass ratio of phosphoric acid to biomass is 1:31.6. Soak time must be sufficient to allow complete and even distribution of phosphorus ions in the biomass.

In step 302, the treated biomass is heated in an anaerobic environment to a temperature of at least 300 C, or a temperature comparable to the un-catalyzed process. This can be achieved through any of a number of prior art methods, including with heated, inert or reducing sweep gas, with an externally heated reactor, or with a heated media reactor. The product material is cooled to ambient temperature. At this stage, an amorphous, hard biomass carbon, containing phosphorus groups has been produced and can be utilized as a final product for appropriate applications such as biochar. A phosphorus containing biochar has several agricultural benefits, as phosphorous is a valuable fertilizer and the cation exchange capacity of biochar can increase the bioavailability of phosphorus.

In step 303, the biochar material is soaked in water. Catalysts are recovered from the carbon through soaking in water, sufficient to dissolve phosphorus ions into $H_3PO_4$. The result of this process is an amorphous, hard biomass carbon in suspension in water, and recovered $H_3PO_4$ catalyst.

In step 304, the catalysts recovered from step 303. The carbon can be easily separated from silica ash particles, dried and utilized as a final product at this stage. This will result in a disordered, amorphous carbon, which can be utilized in a range of applications from biochar, a sorbent for gaseous and aqueous materials, and a structural filler for polymer and elastomer materials.

Use of $H_3PO_4$ at these ratios has increased the yield of solid carbon from corn stover at 600 C from ~18.5% on a moisture and ash free basis (MAF) to 31.1%, a 68% increase.

Other phosphorus loadings have impacted yields as follows: 1:1000 improved yields 31%, 1:50 improved yields 79%, while higher loadings of 1:20 decrease yields by 20%.

Figure 11:
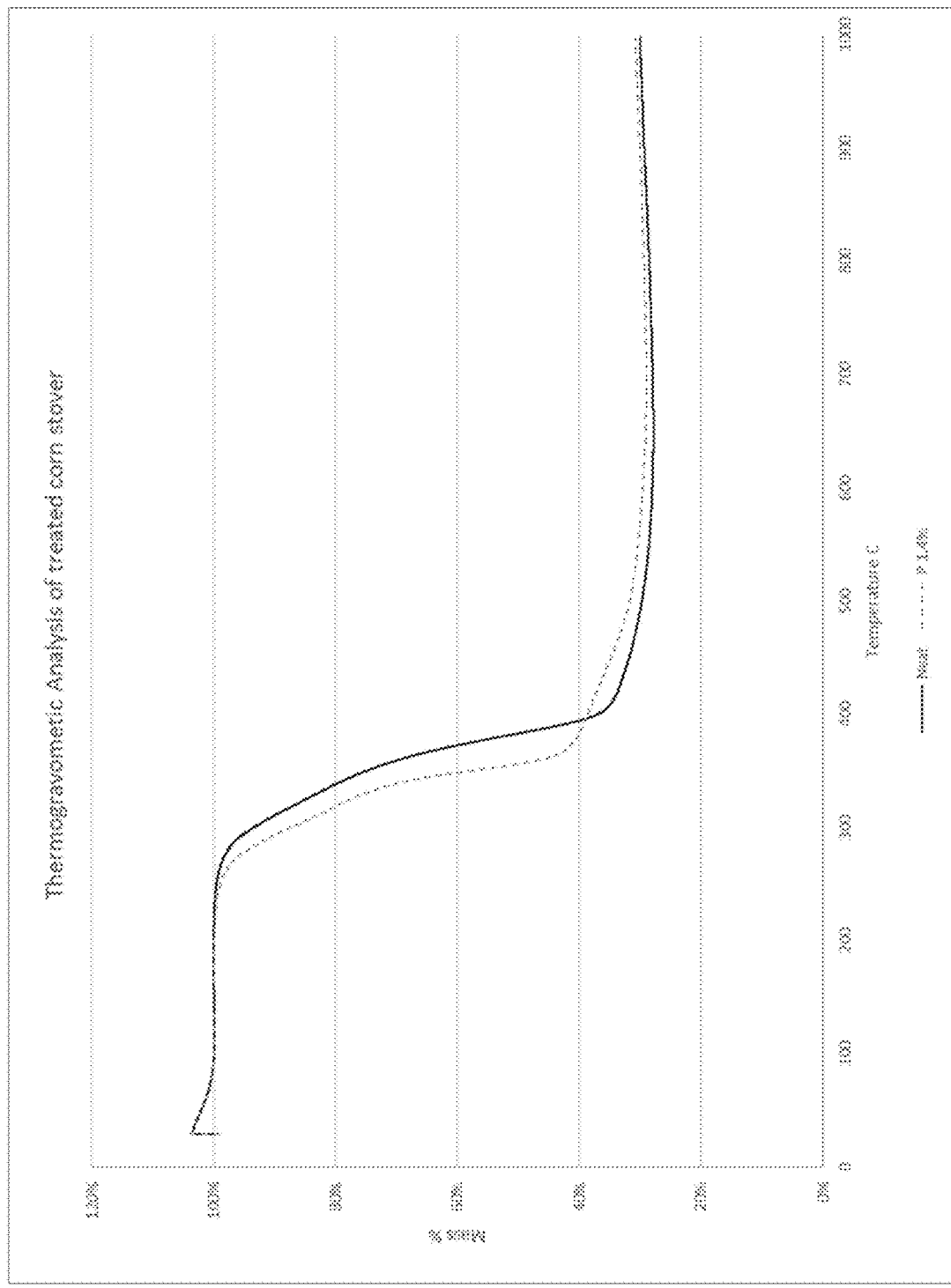
FIG. 11 is a diagram illustrating a graph of Thermogravometric analysis of treated corn stover according to some embodiments.

FIG. 11 is a diagram illustrating a graph of Thermogravometric analysis of treated corn stover according to some embodiments. The graph depicts heating carbonaceous feedstock material on a scale to measure how the material loses weight at different temperatures. The graph depicts untreated corn stover (i.e., Neat) and corn stover treated with phosphoric acid at 1.4%. The graph illustrates that the carbonaceous feedstock material treated with the phosphoric acid stops decomposes sooner and at a higher yield than the untreated corn stover. Addition of 4:100 phosphoric acid to dry carbonaceous feedstock material reduces the temperature of pyrolysis onset from 273 C to 256, although significant chemical activity in the form of dehydration begins below 150 C. The pyrolysis exotherm for phosphoric acid treated corn stover at 4% ends at 373 C, at a 41% mass yield, as compared to untreated corn stover which ends at 415 C at 35% mass yield, as measured by thermogravimetric analysis.

Figure 12:
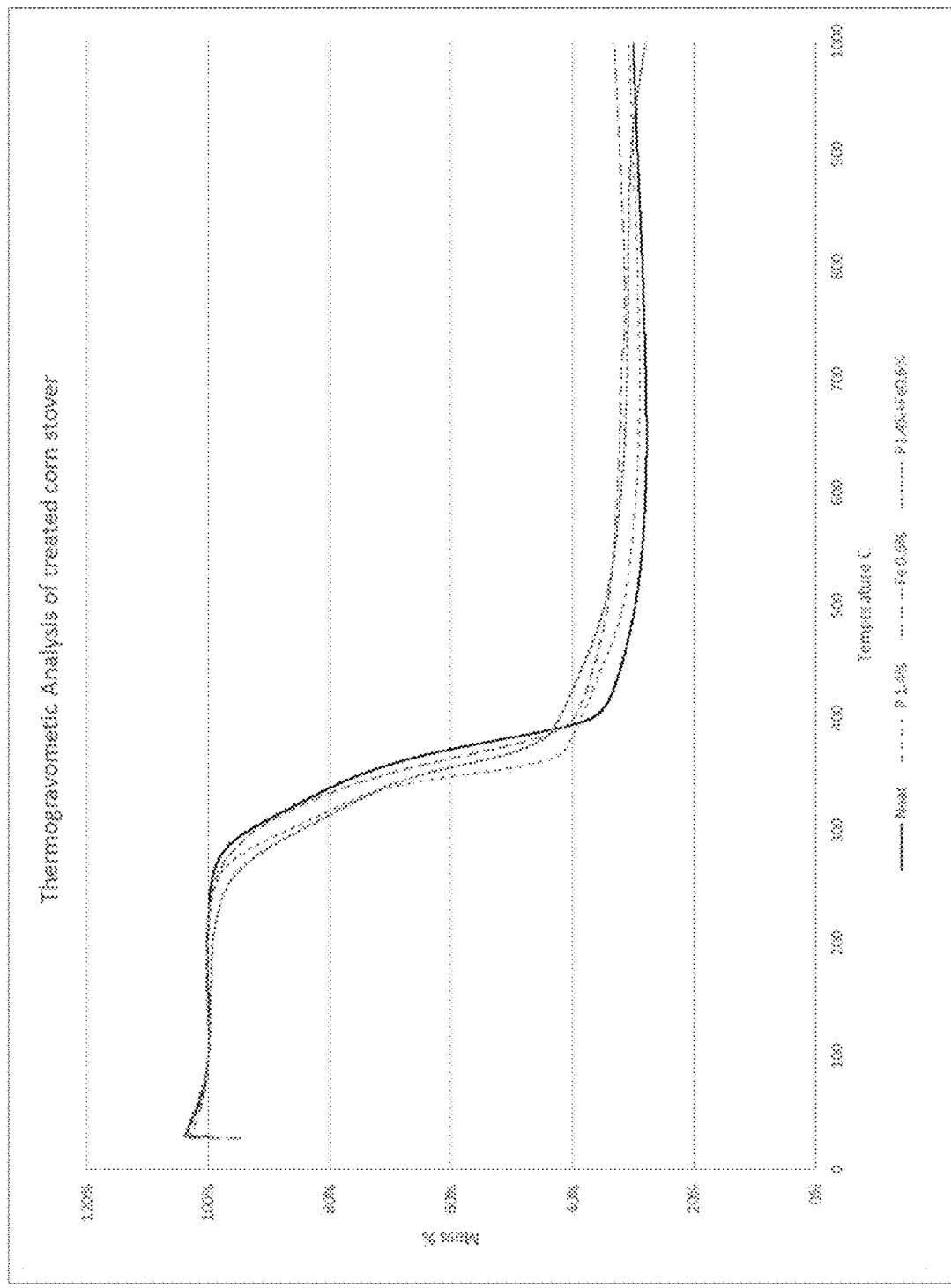
FIG. 12 is a diagram illustrating a graph of Thermogravometric analysis of treated corn stover according to some embodiments.

FIG. 12 is a diagram illustrating a graph of Thermogravometric analysis of treated corn stover according to some embodiments. The graph depicts heating carbonaceous feedstock material on a scale to measure how the material loses weight at different temperatures. The graph depicts untreated corn stover (i.e., Neat) and corn stover treated with phosphoric acid at 1.4%. The graph also depicts the corn stover treated with iron nitrate, and iron nitrate along with phosphoric acid. While there is a change in the decomposition of the corn stover with iron nitrate alone, the treatment of the corn stover with iron nitrate and along with phosphoric acid causes the corn stover to begin decomposing earlier. The combination of phosphoric acid at 4:100 and iron at 0.6:100 reduces the onset of pyrolysis to 226 C, whereas adding iron alone only reduces the onset temperature to 261 C. This shows significant catalytic interaction between iron and phosphorus in the pyrolysis reaction. The pyrolysis exotherm for phosphoric acid treated corn stover with iron ends at 382 C with 45% yield, a higher yield than with phosphoric acid alone at a temperature between untreated stover and $H_3PO_4$ treated stover.

Phosphoric Acid Treatment, Multiphase Heating Example: Another embodiment converting biomass into biochar is focused on the increase in solid carbon yields during pyrolysis through the addition of a phosphoric acid catalyst with biomass feedstock while heating in multiple temperature ranges. Carbonaceous feedstock material treated with phosphorus undergoes distinct decomposition pathways at various temperature regimes. Low temperature reactions, below 150° C., begin the dehydration of carbonaceous structures through a number of methods including cleaving of aliphatic side chains to release $CH_4$ and the formation of aromatic groups and ketones. Holding treated feedstock at lower temperatures is an effective method of maximizing the dehydration of feedstock and maximizing solid carbon retention.

Reactions between 150° C.-450° C. maximize cross linking reactions. Solid carbon retention can be maximized at 300° C. At these temperatures, phosphate and phosphate bridges facilitate the formation of aromatic and polyaromatic carbon structures. At temperatures above 450° C., continued cleavage and crosslinking of the decomposing carbonaceous structures lead to growth of aromatic carbon units. Targeting processing times between 150° C.-450° C. before heating above 450° C. can maximize the formation of aromatic structures which are key for both long term carbon stability and the creation of graphitic structures.

Fe(NO3)3, 900 C Example: One embodiment of the converting biomass into biochar is focused on the production of graphitic carbon nanoplatelets from a biomass feedstock. A broad range of biomass feedstocks are usable, including wood, corn stover, rice straw, nut hulls, and food waste. All tested lignocellulosic biomass has been converted effectively; any carbonaceous feedstock material should be convertible in the field of this invention.

Figure 4:
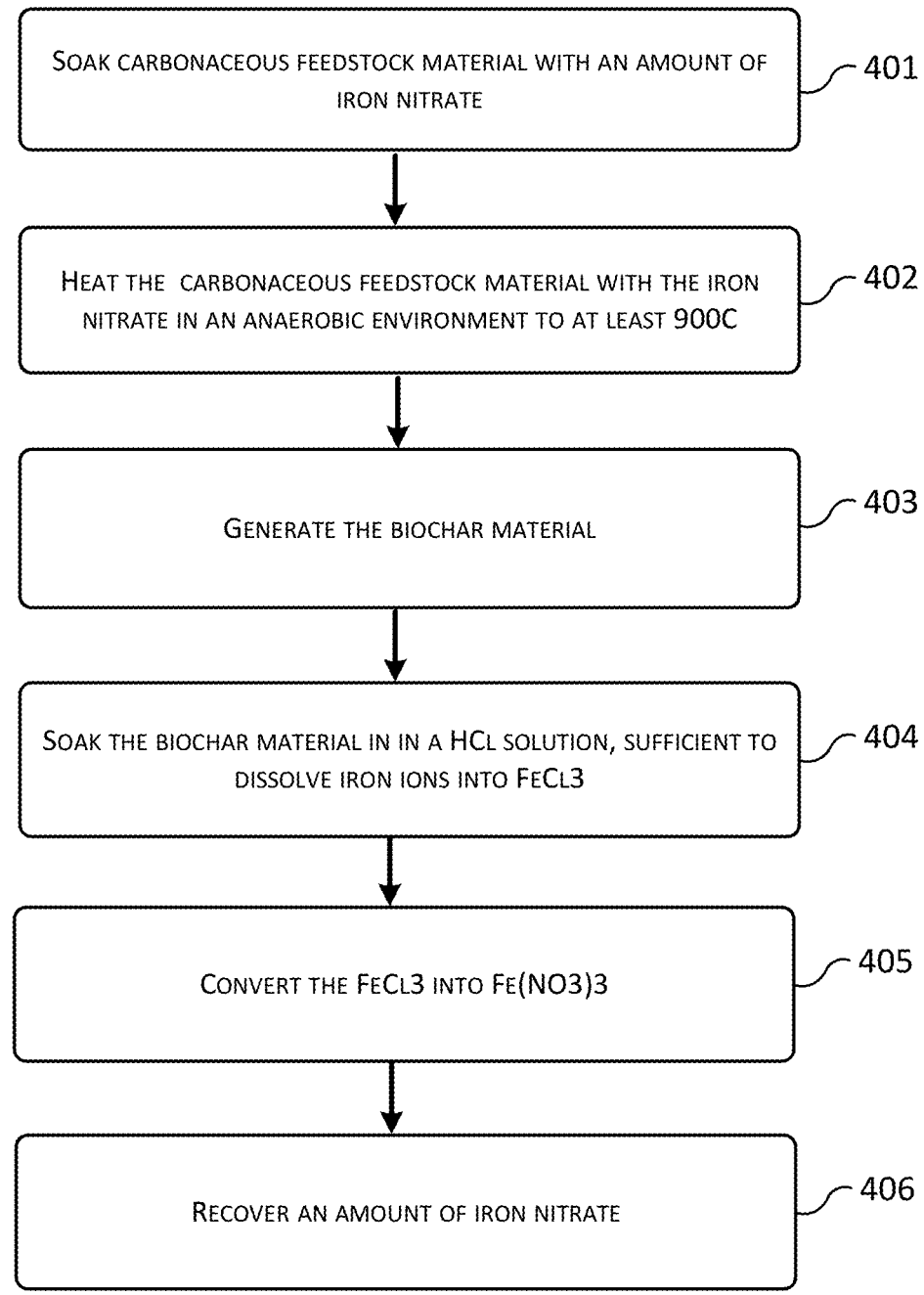
FIG. 4 is a flow chart illustrating an exemplary method 400 that may be performed in some embodiments.

FIG. 4 is a flow chart illustrating an exemplary method 400 that may be performed in some embodiments. The steps of processing are as follows:

In step 401, a mass of biomass is soaked in a solution of $Fe(NO_3)_3$ such that the biomass absorbs iron at a 1:20 ratio (20 units of dry biomass for every one unit of iron). When using $Fe(NO_3)_3$, the mass ratio of iron nitrate to biomass is 1:4.62. Soak time must be sufficient to allow complete and even distribution of iron ions in the biomass.

In step 402, the treated biomass is heated in an anaerobic environment to a temperature of at least 900 C. Heating the treated biomass may be achieved through any of a number of existing prior art methods, including with heated, inert or reducing sweep gas, with an externally heated reactor, with a heated media reactor, and/or other known methods.

In step 403, the biochar material is generated. The product material from step 402 is cooled to ambient temperature. At this stage, a turbostratic, graphitic carbon containing iron groups has been produced and can be utilized as a final product for appropriate applications.

In step 404, the biochar material is soaked in an HCl solution. Catalysts are recovered from the turbostratic, graphitic carbon through soaking in a HCl solution, sufficient to dissolve iron ions into $FeCl_3$.

In step 405, the $FeCl_3$ is converted to $Fe(NO_3)_3$ by sedimenting the $FeCl_3$ with NaOH into $Fe(OH)_3$+NaCl. $Fe(OH)_3$ can be converted back to $Fe(NO_3)_3$ using nitric acid. Direct recovery of the catalyst in nitric acid is also possible.

In step 406, an amount of iron nitrate is recovered. Method 400 results in a turbostratic, graphitic carbon in suspension in water, and recovered $Fe(NO_3)_3$ catalyst. The turbostratic, graphitic carbon can be dried and utilized as a final product at this stage.

In some embodiments, the suspended turbostratic, graphitic carbon is exfoliated using sonication of high shear mixing in water. The exfoliation stage separates nanoplatelets from turbostratic clusters into individual nanoplatelets. The energy and time during exfoliation will determine the final distribution of particle layer counts (thickness) and lateral dimensions. The suspension of graphitic nanoplatelets can be utilized as a final product in this stage.

Optional steps may be performed. In a first optional step, spray drying may be utilized to prevent agglomeration of nanoplatelets during dewatering (a common issue during graphene drying). In a second optional step, a stable nanoplatelet suspension can be produced through the addition of specific dispersion aides, which are also useful for optimizing the dispersion for the final utilization. Specific details on suspension formulation will be discussed in a later section. In a third operational step, exfoliated graphitic nanoplatelets can be dried in bulk, which will result in ordered stacking of the platelets due to the Van der Waals forces between graphene sheets. This will result in an ordered, stacked graphitic material, which can be optimized for the production of plant based, graphite like materials.

The above method produces plant-based graphene nanoplatelets (pGNP) by converting an amorphous, sp2/sp3 bonded hard carbons typical of charcoals into graphitic sp2 bonded carbons. When the feedstock used is photosensitized biomass (as opposed to plastic waste, coal, or other carbon sources), carbon dioxide released from thermal decomposition of the feedstock does not represent a net increase to atmospheric CO2 levels. The pGNP produced from biomass sources is solid carbon, removed from the atmosphere through photosynthesis and graphitization. As a result, one kg of pGNP at 93.3% carbon by mass is equivalent to 3.43 kg CO2 equivalent sequestered from the atmosphere, pGNP production involves several other points of CO2 generation. The production process for pGNP production uses 1,002 MJ/kg of energy, the majority of which is used for process heating at various stages. This is more energy than is required for chemical exfoliation of graphite, but less than thermal exfoliation. This can be provided through natural gas combustion, electricity, or recovered gasses from the thermal decomposition of biomass. Electric generation is variable based on the means of generation. Natural gas combustion for the required energy would result in emissions of 66 kg of CO2 equivalent per kg pGNP.

In some embodiments, a ratio of iron to carbonaceous feedstock material is 1:20 and the feedstock is heated to a temperature of 900 C, producing a graphic carbon with a 6.12:1 ratio of sp2:sp3 carbons, with 9% C—O functional groups and 7% carboxyl functional groups. Raman spectroscopy of the exfoliated graphitic nanoplatelets gives a 2D:G ratio of 0.25:1 or greater.

Figure 16:
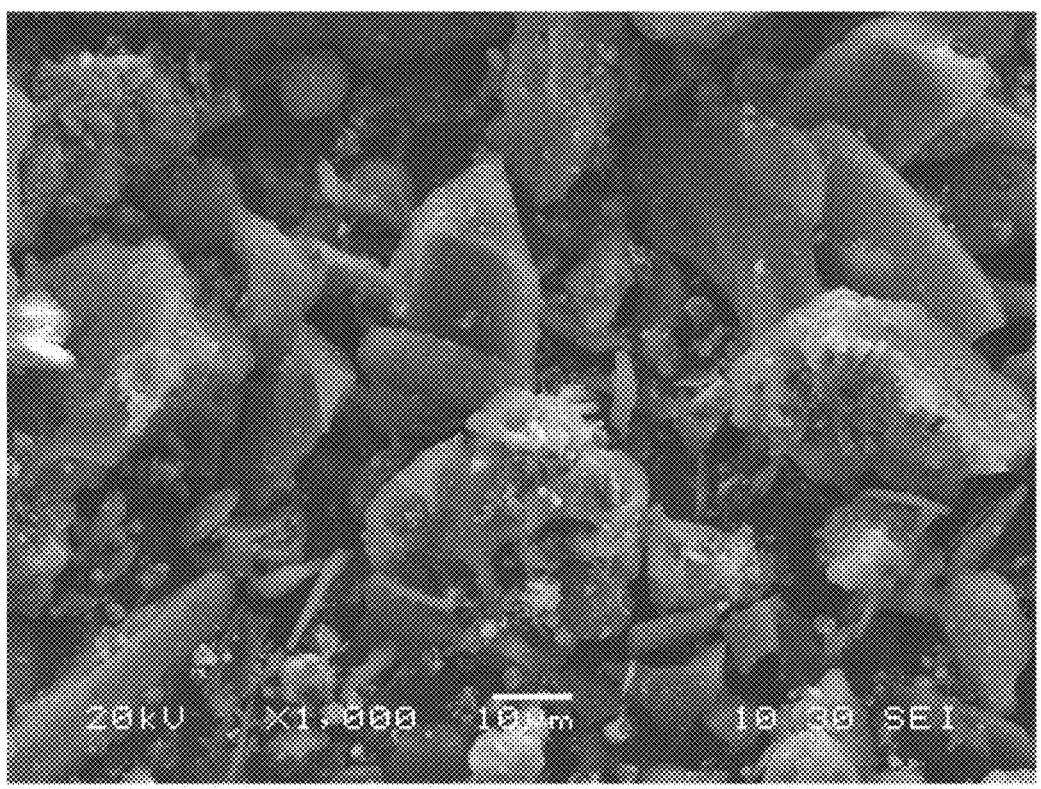
FIG. 16 is a diagram illustrating a scanning electron microscope (SEM) image according to some embodiments.
Figure 17:
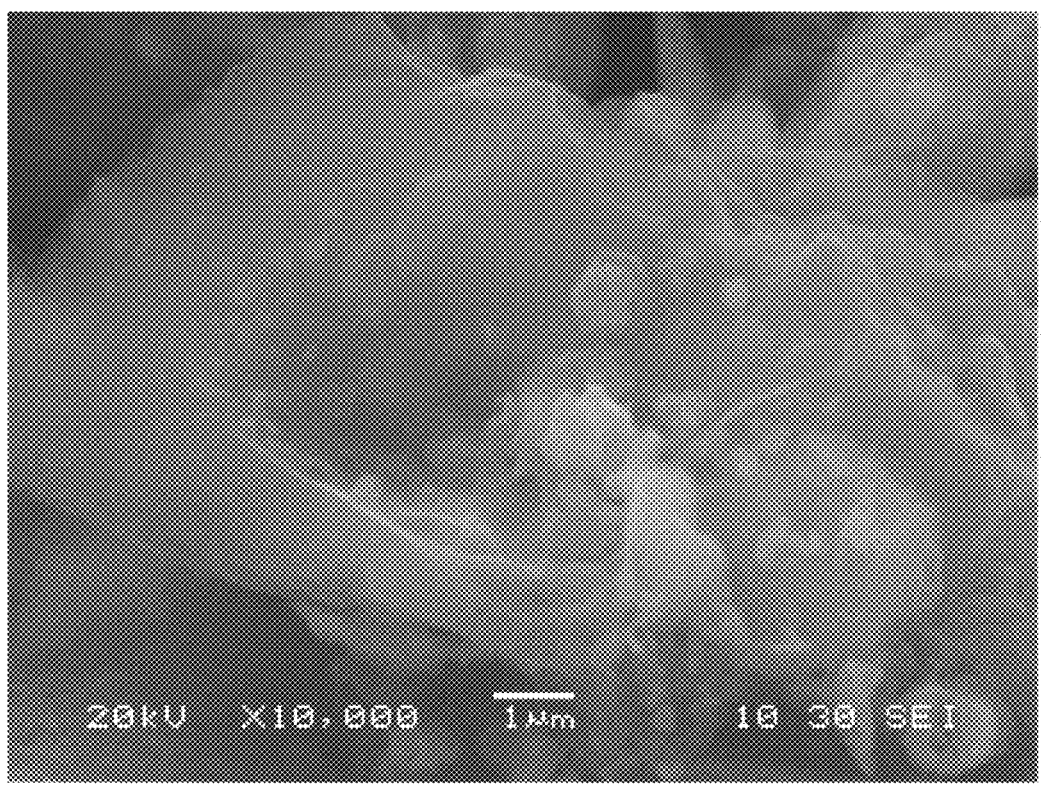
FIG. 17 is a diagram illustrating an SEM image according to some embodiments.
Figure 18:
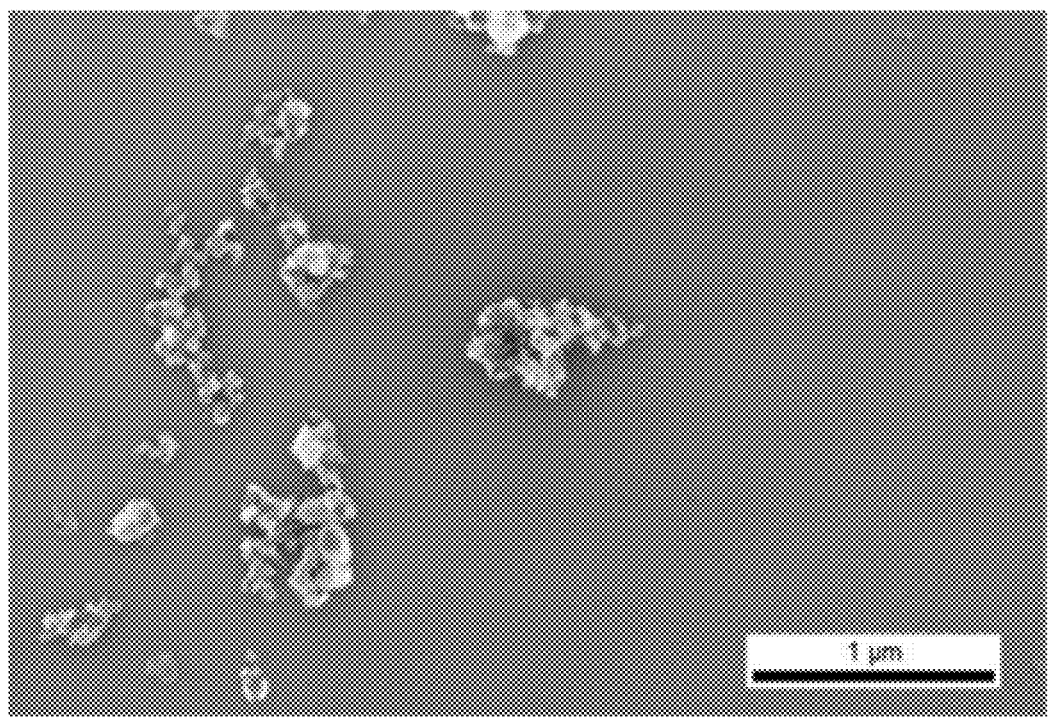
FIG. 18 is a diagram illustrating an SEM image according to some embodiments.

In some embodiments the fineness of the product carbon (i.e., the generated biochar material) is increased by a factor of 10 or more after a grinding or milling process. FIGS. 16-17 illustrate SEM images of untreated biomass carbons typically retain the structure and morphology of the parent materials down to the µm scale, and cannot be milled to a size below 1 µm. Carbons treated by applying a solution of Fe(NO3)3 to the carbonaceous feedstock material take on a distinct platelet morphology and sub µm size as shown in the SEM image of FIG. 18. These particles are substantially smaller than the particles illustrated in FIGS. 16-17, and have a narrow, high lateral dimension.

Figure 19:
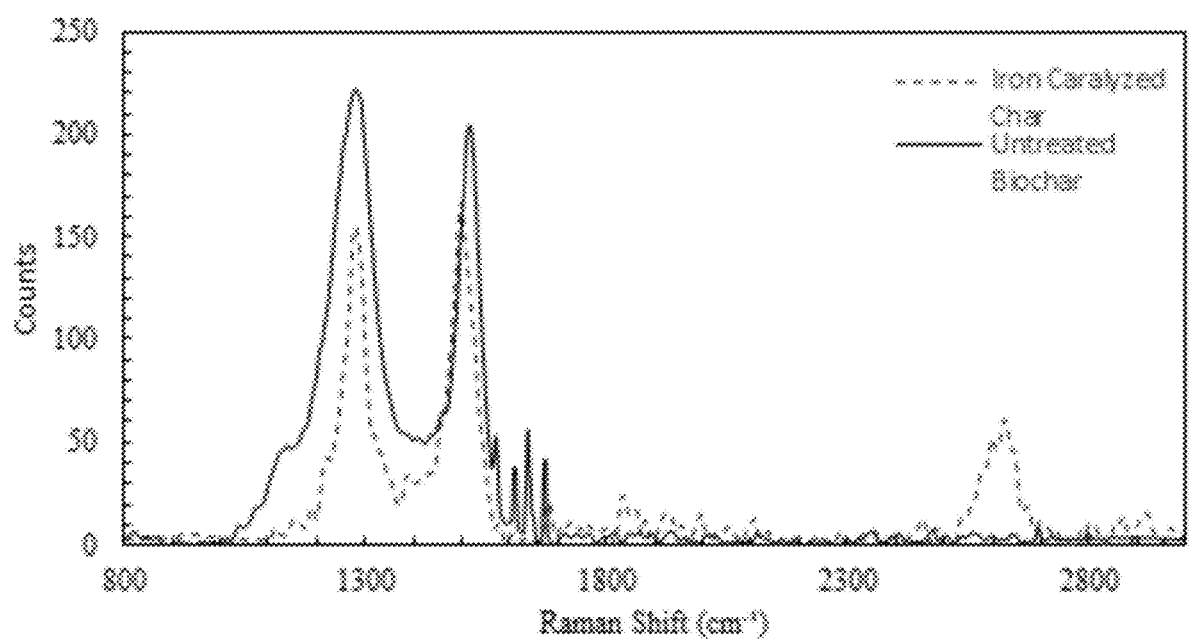
FIG. 19 is a diagram illustrating a graph of a Raman spectra of iron catalyzed char and untreated biochar.

Graphene is identified in Raman spectroscopy by three characteristic peaks, referred to as the D, G, and 2D peak. The ratios between these peaks indicate the properties of the graphene measured. Using a 532 nm laser, the D peak is at 1350 cm-1, the G peak is at 1580 cm-1, and the 2D peak is at 2700 cm-1. The 2D peak in particular and the ratio of 2D/G identifies the extent of sp2 bonding in graphene which is absent in amorphous carbons. Raman spectroscopy of the iron nitrate catalyzed biochar, as shown in FIG. 19, gives an average 2D/G ratio of 0.28 with a maximum of 0.68, showing a few-layer graphene of 3 or more layers. A Raman spectra of an amorphous uncatalyzed carbon-produced from the same feedstock as the iron catalyzed carbon and carbonized though identical heating under an inert atmosphere—is given as a contrast. The 2D peak is entirely absent in the uncatalyzed carbon sample, showing typical sp3 bond structure with no sp3 aromatic structure.

The D/G ratio measures the degree of disorder of the flakes, along with surface functionality and the edge properties of graphene nanoparticles. An average D/G ratio of 0.80 for Iron Catalyzed Char ratio shows a highly disordered sample, which is to be expected from a non-graphite derived material. A D/G of >1.0, as shown in the wood charcoal sample, is indicative of an amorphous, hard carbon with sp3 bonding.

In some embodiments, the performance of the methods results in carbon materials (i.e., generated biochar material) with a more homogeneous and pure carbon structure versus untreated materials as measured by X-ray Photon Spectroscopy (XPS), Nuclear Magnetic Resonance (NMR), Solid-State Cross-Polarization Magic Angle Spinning Carbon-13 Nuclear Magnetic Resonance (CP/MAS 13C-NMR), or optical anisotropy. Furthermore, elemental analysis for determination of Oxygen-to-Carbon (O:C) or Hydrogen-to-Carbon (H:C) elemental ratios results in lower O:C or H:C elemental ratios versus untreated materials, and therefore greater carbon stability in the environment.

In some embodiments, biomass carbons have a range of elemental compositions with molar O:C ratios from 0.54:1 to 0.71:1 and molar H:C ratios from 1.32:1 to 1.66:1. The pyrolysis of untreated biomass results in molar O:C ratios from 0.16:1 to 0.6:1 and molar H:C ratios from 0.3:1 to 1.5:1, with lower ratios the results of higher heating temperatures. The use of phosphoric acid reduces the range of molar O:C ratios to 0.02:1 to 0.39:1 and molar H:C ratios from 0.25:1 to 0.9:1 with lower ratios the results of higher heating temperatures. At 200 C H:C ratios are reduced by 21-42%, at 400 C they are reduced 46-52%, and at 600 C they are reduced to 20-50%. At 200 C O:C ratios are reduced by 22-37%, at 400 C they are reduced 37-62%, and at 600 C they are reduced 67-89% to trace levels. The increasing efficiency at removing oxygen and hydrogen at higher temperatures has a significant impact on the purity of the carbon product and the long term carbon stability for carbon sequestration.

Figure 13:
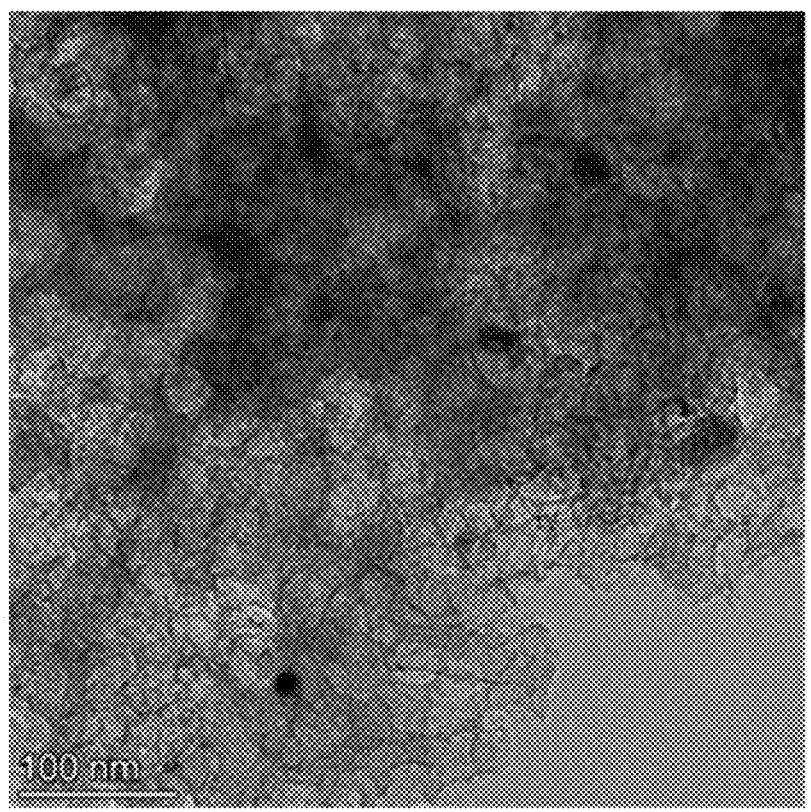
FIG. 13 is a diagram illustrating a transmission electron microscopy (TEM) image according to some embodiments.
Figure 14:
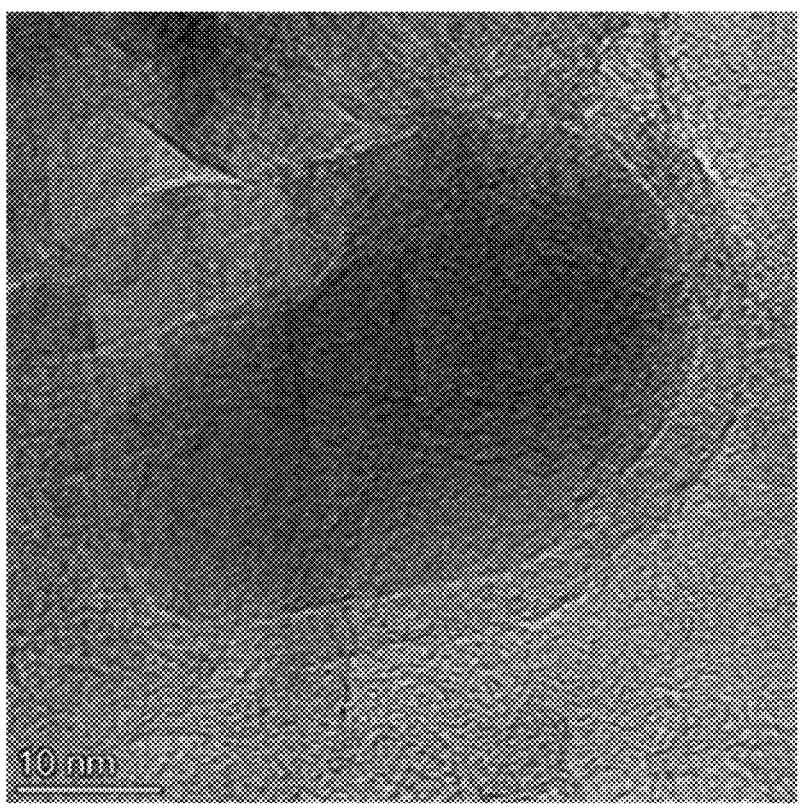
FIG. 14 is a diagram illustrating a TEM image according to some embodiments.
Figure 15:
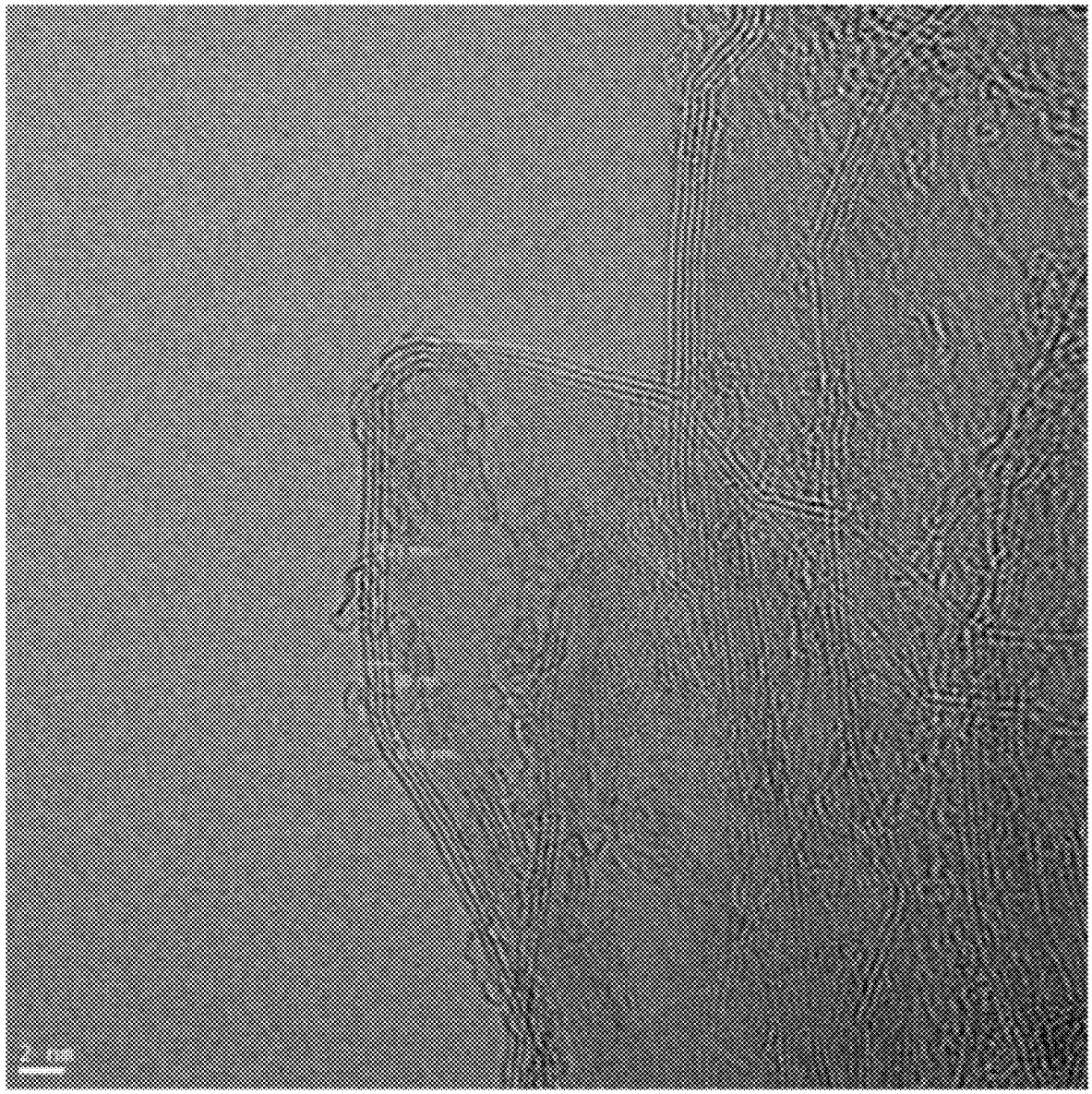
FIG. 15 is a diagram illustrating a TEM image according to some embodiments.

FIGS. 13-15 depict TEM imaging of platelet morphology and layers. FIGS. 13-15 illustrate clustering of nanoparticles at different scales of iron catalyst treated carbonaceous feedstock material. FIG. 13 shows clustering of particles. FIGS. 14 and 15 show layers of particles. FIG. 15 highlights a 3 carbon layer flake. In some embodiments, the exfoliation of the biochar material may produce a graphitic nanoplatelet, with between 1-10 discernible carbon layers, a particle thickness between 0.335-3.400 nm, and lateral dimensions from 50-1000 nm.

In some embodiments, phosphoric acid is used in conjunction with iron nitrate to lowers or reduce the temperature and an energy threshold for carbonization reactions when the carbonaceous feedstock material is heated, as well as increasing the solid yield of pyrolysis products, e.g. biochar.

In some embodiments, a pyrolysis temperature is greater than 900 C and use of phosphoric acid in conjunction with iron nitrate increases the yield of graphitic nanoplatelets from 5% to 10%.

In some embodiments, a ratio of iron to carbonaceous feedstock material is 1:20 and the feedstock is heated to a temperature of 900 C, producing a graphic carbon with a 6.12:1 ratio of sp2:sp3 carbons, with 9% C—O functional groups and 7% carboxyl functional groups. Raman spectroscopy of the exfoliated graphitic nanoplatelets gives a 2D:G ratio of 0.25:1 or greater.

Graphic Carbon Nano-Particle Material and Products

In some embodiments, a novel composition of matter and the method for its manufacture for use as a carbon nano-material, commonly referred to as graphene, in any application where traditional mineral graphenes are provided.

In some embodiments, a method is provided for the creation of a novel composition of carbon nano-materials which is created through the use of a carbonaceous feedstock which is processed in such a way as to dramatically increase the aromatic, sp2 structure of the final product over that of an amorphous, pyrolytic carbon. The feedstock used may be of a broad variety of materials which are composed predominantly of carbon including, but not limited to, plastics, rubbers, condensed tars, pitch, biomass, biomass derivatives, coals, and coal derivatives.

In some embodiments, a process is provided for producing carbon nano-material material from a broad range of inexpensive materials with a wide range of properties as well as renewable and environmentally friendly materials.

In some embodiments, a catalyst mixture is used in a liquid phase to maximize effectiveness and molecular interaction with the feedstock. In some embodiments this catalyst will be a metal salt mixture and in some it will be a metal acid solution. As well, this invention focuses on the selection of catalysts which can be easily recovered and recycled in the process to reduce cost, waste, and pollution.

Figure 5:
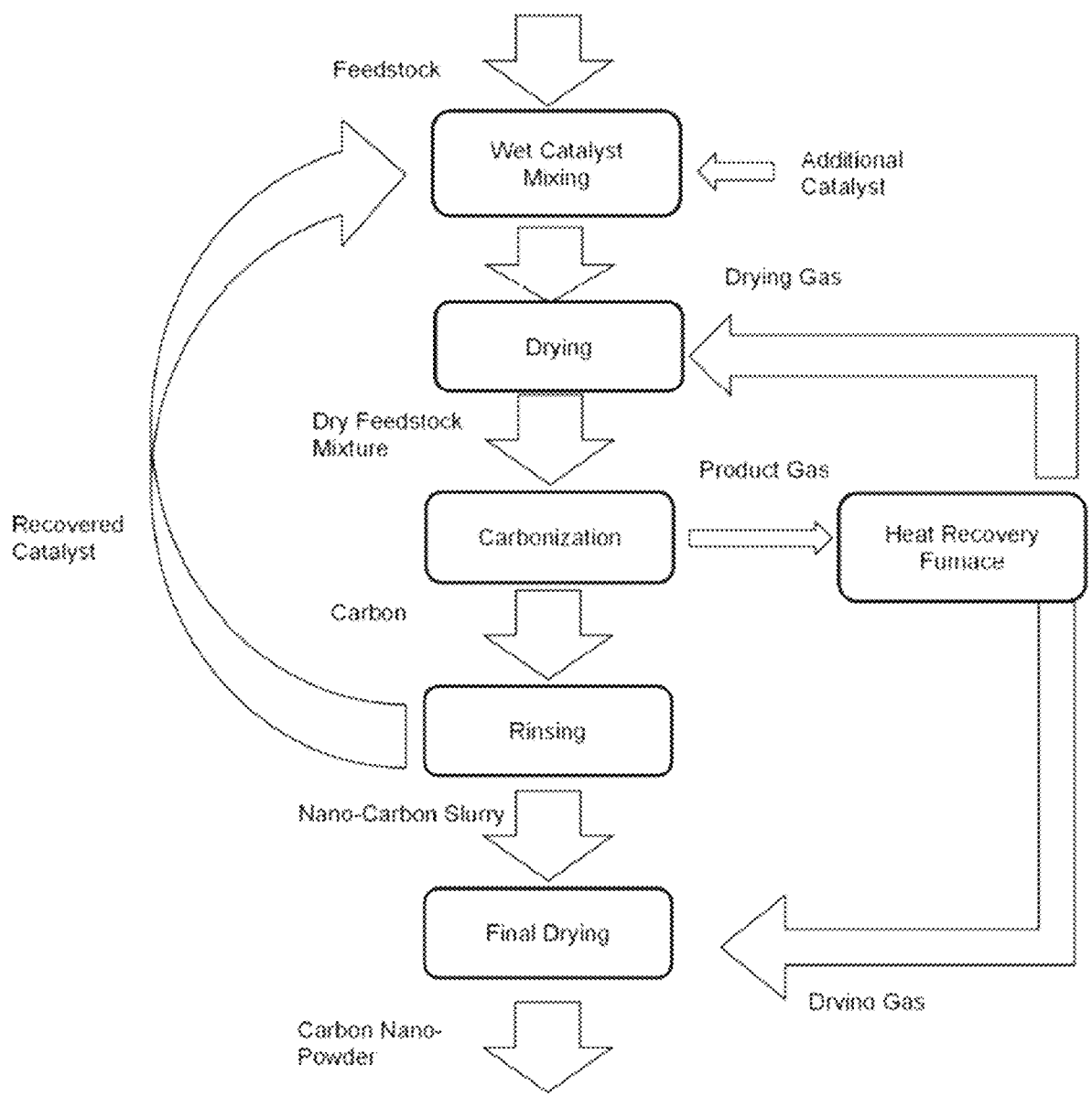
FIG. 5 is a flow chart illustrating an exemplary method 500 that may be performed in some embodiments.

In some embodiments, a novel composition of carbon nano-material is provided which is similar in structure to graphite derived graphenes and which can be used in the same applications. Because of the ability to select feedstock and catalyst combinations, the invention allows for the ability to tune the properties of the carbon nano-powder including the particle size, shape, and surface chemistry to optimize for a broad range of uses FIG. 5 is a flow chart illustrating an exemplary method 600 that may be performed in some embodiments. Feedstock, which may be in the form of petroleum pitch, coal tar, recycled plastics, wood chips, wood shavings, saw dust, corn stover, agricultural residue, or any other suitable form, is mixed with a metal catalyst mixture in solution.

The feedstock is mixed and allowed to soak for a period of time sufficient to allow thorough exposure. The wet mixture is introduced to the dryer, where moisture is driven off. The dry mixture is introduced into the carbonization reactor, where it is thermally decomposed at high temperature into solid graphitic carbon and product gas. Both drying and carbonization may be accomplished by any one of several means available in the art, including externally fired tube furnace, direct fired tube furnace, inductive heating, or microwave heating. The product gas is burned in the heat recovery furnace to provide heat for the drying of the feedstock and the nano-carbon slurry. Heat recovered may also be used to drive the carbonization process or recovered for energy generation. The carbonized material is rinsed to dissolve the catalyst, which is collected and re-used for incoming feedstock (additional catalyst may be added if there is less than 100% recovery). The rinsed, catalyst free nano-carbon slurry undergoes final drying to give a high purity carbon nano-powder.

Figure 6:
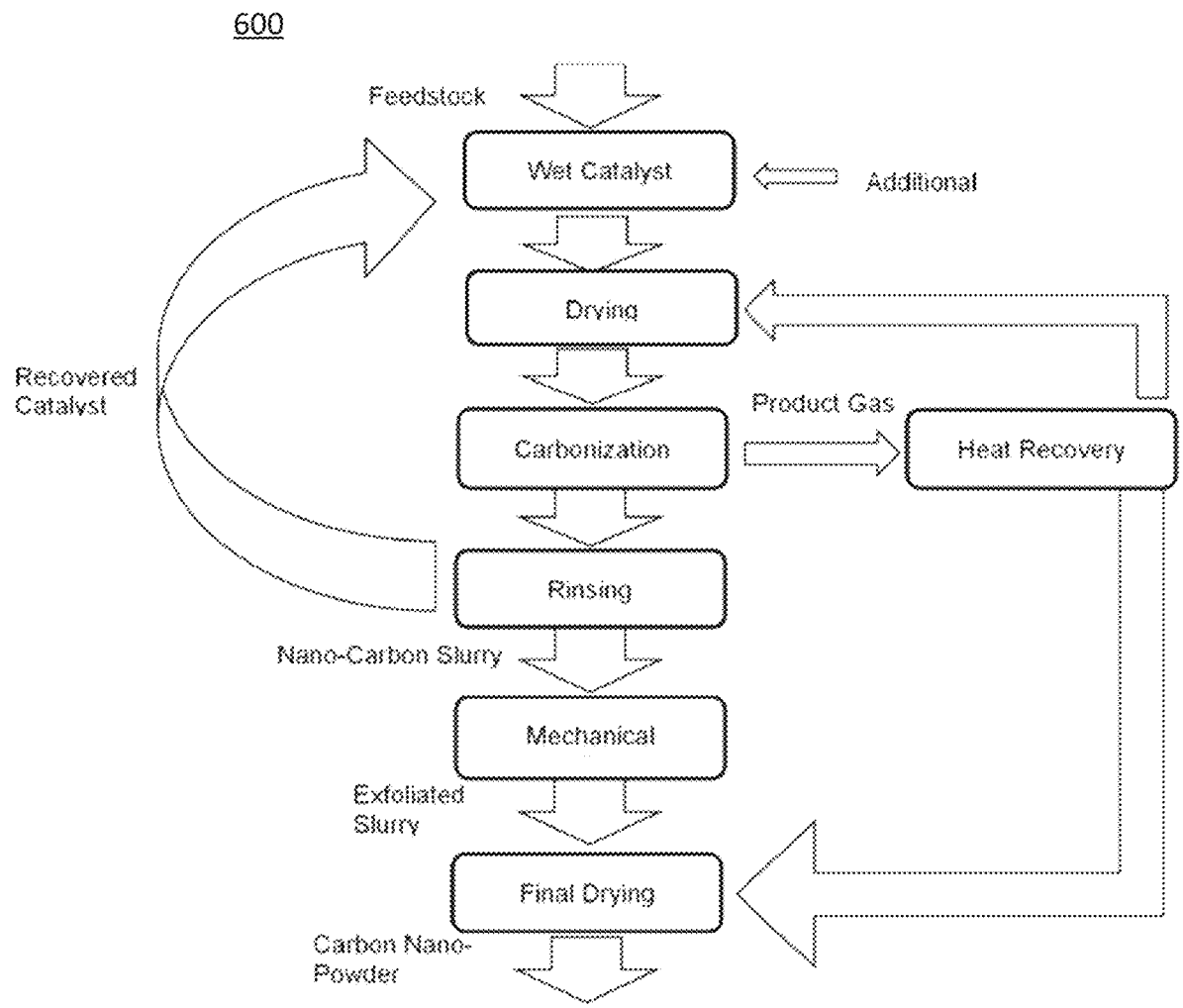
FIG. 6 is a flow chart illustrating an exemplary method 600 that may be performed in some embodiments.

FIG. 6 is a flow chart illustrating an exemplary method 700 that may be performed in some embodiments. The process 700 begins identically to the process in figure one, through the rinsing step. In this modified process, after rinsing the nano-carbon slurry is mechanically exfoliated by any one of several means available in the art, including sonication, wet milling, or high shear exfoliation. This process further refines the nano material by separating particles and graphene sheets. The exfoliated slurry is dried to produce a final nano-carbon powder.

Figure 7:
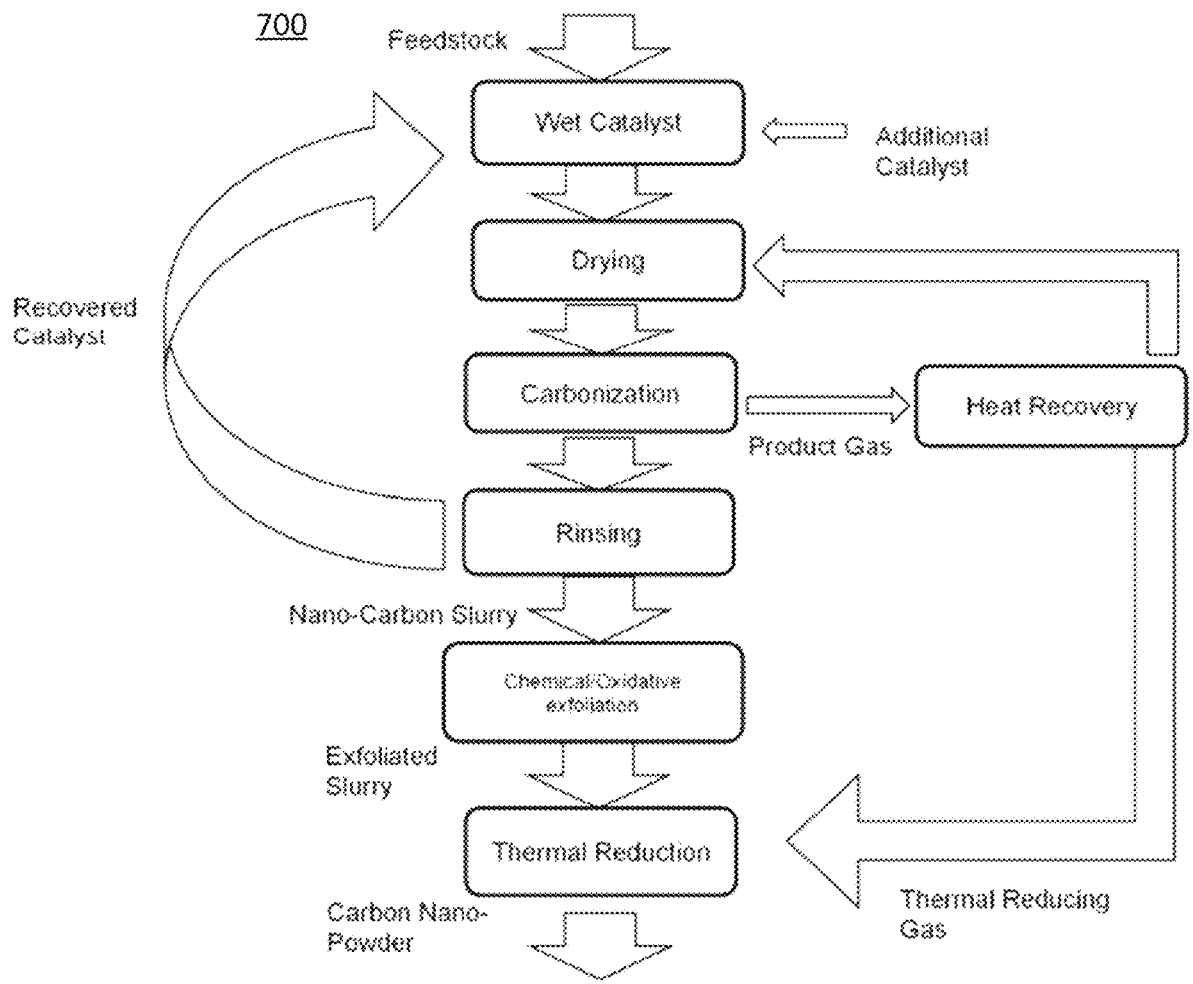
FIG. 7 is a flow chart illustrating an exemplary method 700 that may be performed in some embodiments.

FIG. 7 is a flow chart illustrating an exemplary method 800 that may be performed in some embodiments. The process begins identically to the process in figure one, through the rinsing step. In this modified process, after rinsing the nano-carbon slurry is chemically exfoliated by any one of several means available in the art, including oxidation to graphene oxide. This process further refines the nano material by separating particles and graphene sheets into sheets of graphene oxide or similar. The exfoliated slurry is reduced to a final nano-carbon powder, either by thermal reduction at sufficient temperatures to decompose the oxygen bonds with the nano-carbons, or by another means available in the art.

The initial steps required to create the novel composition of matter are herein described, a carbonaceous feedstock material must be treated with catalytic chemicals in order to prioritize the development of hybridized aromatic bonds during carbonization. This can be accomplished in a number of ways, including doping the feedstock material with a metal catalyst such as iron, iron nitrate, iron chloride, nickel, nickel nitrate, nickel chloride, chromium, chromium nitrate, cobalt, cobalt nitrate, copper, copper nitrate, copper chloride, rubidium, platinum, platinum nitrate, molybdenum, and/or molybdenum chloride. The selection of catalyst or combination of catalysts will alter the final properties of the carbon nano material produced. Feedstock treatment with acid can also be utilized to break down existing structures, allowing for more controllable restructuring during pyrolysis. After doping, the material must be heated sufficiently in a low oxygen environment to decompose bound hydrogen and oxygen, leaving a high carbon final product. This can be done through any number of means which exist in the art, including external heating, steam pyrolysis, or staged pyrolysis as described in Applicant's previous U.S. Pat. No. 9,505,984 B2. Any cost-effective method for the fast or slow pyrolysis of carbonaceous solids would be suitable for this process.

Pyrolysis-gas produced through the heating may be captured and utilized as a source of heat or energy or for the production of beneficial co-products.

The product carbon nano-powder can be rinsed to remove catalytic elements. Depending on the catalysts used, this may be a rinse with water or with an acid to dissolve metals. The rinse solution can be re-used to reduce catalyst waste and to prevent the release of pollutants into the environment. During this wet stage, the carbon nano-powder can be exfoliated sonically, mechanically, or by other means, although this is not a necessary step in most cases.

Finally, the product is dried and packaged for final use. Not all stages of the process are essential, and variation of which stages are included, along with the conditions of pyrolysis temperature and catalyst selection give a wide range of possible graphene's which can be produced and tuned for end use.

The material described herein has a number of primary and secondary properties and characteristics which make it ideal for use as a carbon nano-material and which differentiate it from conventional, mineral derived graphenes which present meaningful improvements in industrial and commercial applications. The primary properties include;

In some embodiments, there is a composition of matter or particle created through the catalyzed pyrolysis of a solid carbonaceous feedstock.

In some embodiments, there is a composition of matter or particle which has a high purity of atomic carbon that displays a high degree of hybridized aromatic, sp2 bonding.

In some embodiments, the composition of matter has a particle size with lateral dimension below 1 micron or μm; which may be tuned through classification to a desired size for specific applications.

In some embodiments, the secondary properties describe a composition of matter created through the catalytic pyrolysis of carbonaceous feedstock materials which functions as a graphene material. These properties include, but are not limited to;

In some embodiments, the product has a significantly increased fraction of carboxylic functional groups which improve dispersibility in water, alcohol, and other common solvents, as well as serving as bonding handles for graphene functionalization.

In some embodiments, the product has a functionalization of the carbon surface with functional groups to better interact with the compounds it is being mixed with.

In some embodiments, the product has a unique distribution of particle sizes and shapes, which can provide benefit to several applications.

In some embodiments, the product has a disordered, turbostratic bulk structure, which allows for effective exfoliation and nano-particle separation directly into a suspension without the need for intermediate exfoliation.

In some embodiments, the product is a carbon material with enhanced physical and chemical stability when applied to soil systems or used for carbon sequestration as compared to conventional biomass charcoal.

Example Improving Carbon Yield and Carbon Stability

The following further describes a method for the production of a bio-mineral enriched biochar material. In some embodiments, the method includes collecting a raw biomass feedstock; shredding a raw biomass feedstock to produce shredded particles; collecting soil mineral materials; sorting and/or grindings soil mineral materials; integrating downstream mineral ash materials; grinding and sorting mineral ash materials; blending the soil and mineral ash to create a bio-mineral complex; blending the bio-mineral complex with the shredded raw biomass; subjecting the bio-mineral complex treated raw biomass to a thermal conversion (pyrolysis) process to produce enriched biochar and co-products; collecting non-volatile materials including enriched biochar and mineral-ash at the end of the pyrolysis process; separating the enriched biochar from the mineral ash; introducing the mineral ash into the upstream process; and finally adding the enriched biochar to an agricultural field for carbon sequestration and agronomic benefit.

Figure 8:
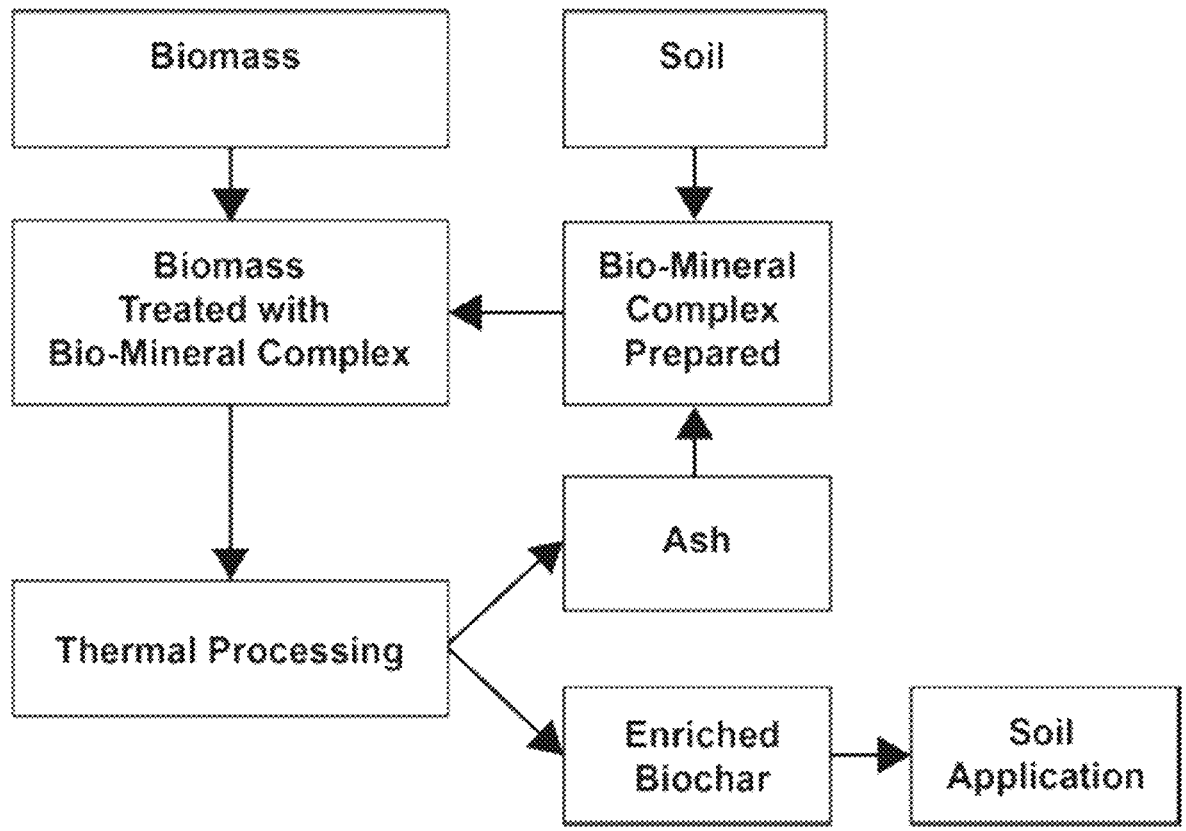
FIG. 8 is a flow chart illustrating an exemplary method 800 that may be performed in some embodiments.

FIG. 8 is a flow chart illustrating an exemplary method 800 that may be performed in some embodiments. Feedstock, which may be in the form of wood chips, wood shavings, saw dust, corn stover, rice straw, cotton straw, wheat straw, forage, agricultural residue, or any other suitable form, is sourced. Native soil is also sourced. Mineral ash is collected from the pyrolysis of biomass feedstock. Mineral ash is mixed with native soil as a dry blend or in solution to form a bio-mineral complex. The biomass feedstock is mixed with the bio-mineral complex as a liquid slurry and allowed to soak for a period of time sufficient to allow thorough exposure. The wet mixture is introduced to the dryer, where moisture is driven off. The dry mixture is introduced into the carbonization reactor, where it is thermally decomposed at high temperature into solid biochar and byproducts. Both drying and carbonization may be accomplished by any one of several means available in the art, including externally fired tube furnaces, direct fired tube furnaces, inductive heating, or microwave heating. The product gas is burned in the heat recovery furnace to provide heat for the drying of the feedstock and the bio-mineral complex slurry. Heat recovered may also be used to drive the carbonization process or recovered for energy generation. The carbonized material exits the pyrolysis reactor and is applied to soil.

Figure 9:
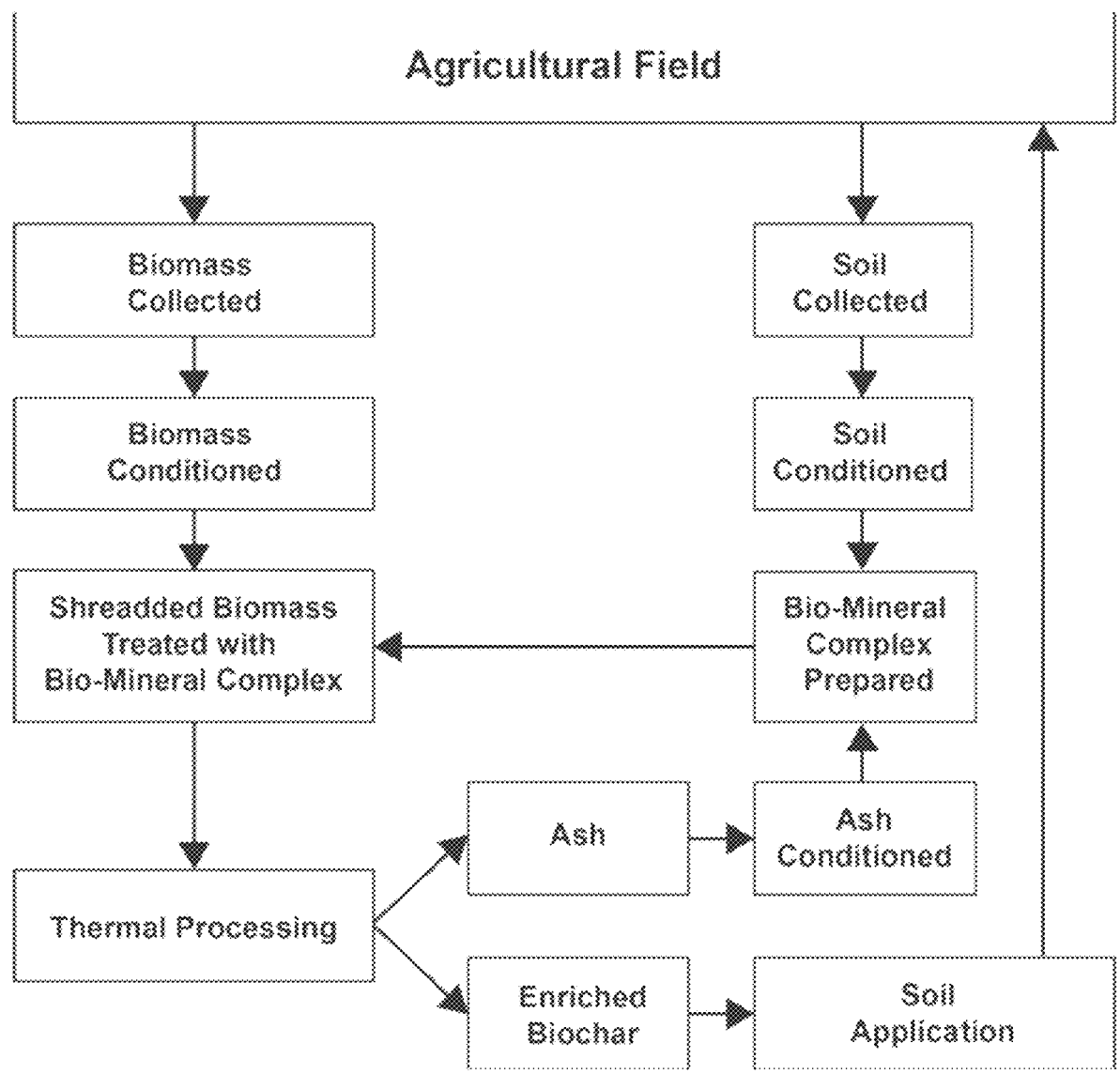
FIG. 9 is a flow chart illustrating an exemplary method 900 that may be performed in some embodiments.

FIG. 9 is a flow chart illustrating an exemplary method 900 that may be performed in some embodiments. FIG. 9 is a diagram illustrating an in-field carbonaceous feedstock material collection and biochar material generation. In this modified process, the biomass and soil are collected concurrently in the field by means of a mobile pyrolyzer system. In this modified process, the resultant enriched biochar materials are reapplied to the same field where materials were originally collected.

Figure 10:
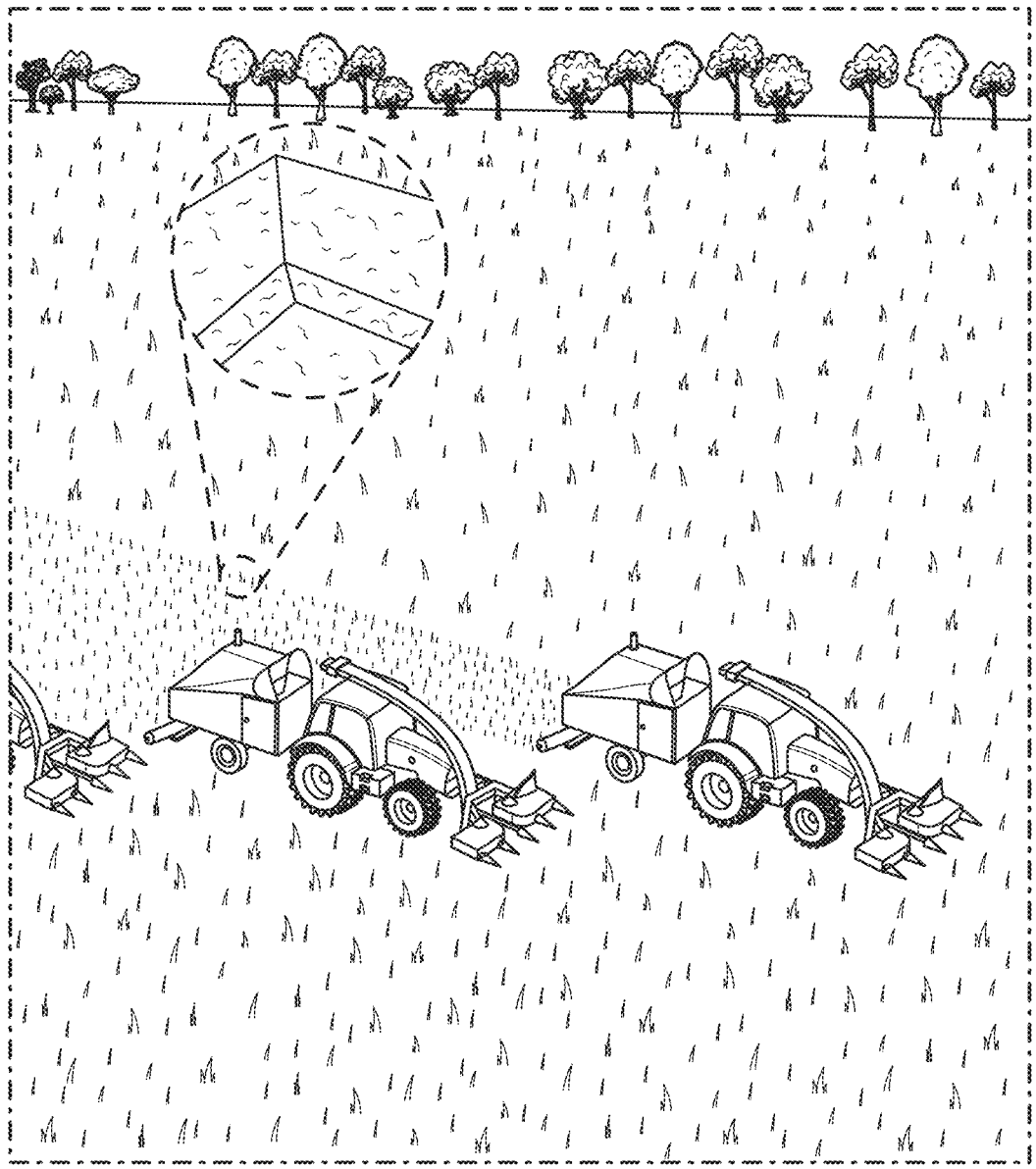
FIG. 10 is a diagram illustrating an in-field carbonaceous feedstock material collection and biochar material generation.

FIG. 10 is a diagram illustrating an in-field carbonaceous feedstock material collection and biochar material generation. A general schematic of the modified process described in FIG. 9, with a fleet of mobile, in-field, pyrolyzers.

It will be appreciated that the present disclosure may include any one and up to all of the following examples.

Example 1

A method of converting a carbonaceous feedstock material into a biochar material, the method comprising: receiving an amount of a carbonaceous feedstock material; applying an amount of a catalyst to the carbonaceous feedstock material; heating the carbonaceous feedstock material and the applied catalyst in an anaerobic environment to a temperature of at least 300 C; and generating the biochar material.

Example 2

The method of Example 1, wherein the anaerobic environment comprises a positive pressure reactor.

Example 3

The method of any one of Examples 1-2, wherein a minimum heating time for heating the carbonaceous feedstock material is 150 C per/second.

Example 4

The method of any one of Examples 1-3, wherein the carbonaceous feedstock material is received onto a conveyor and the catalyst is applied to the carbonaceous feedstock material while moving on the conveyor.

Example 5

The method of any one of Examples 1-4, wherein the carbonaceous feedstock material is received into a container and the carbonaceous feedstock material is soaked with the catalyst.

Example 6

The method of one of Examples 1-5, wherein applying an amount of a catalyst comprises: applying a solution of phosphoric acid to the carbonaceous feedstock material.

Example 7

The method of any one of Examples 1-6, further comprising: recovering the catalyst from the biochar material by soaking the biochar material in water in an amount sufficient to dissolve phosphorus ions into $H_3PO_4$.

Example 8

The method of any one of Examples 1-7, the phosphoric acid removes oxygen and hydrogen from the carbonaceous feedstock material and creates active bonding sites in the carbonaceous feedstock material for carbon lattices to form.

Example 9

The method of any one of Examples 1-8, wherein the phosphoric acid lowers or reduces a temperature and an energy threshold for carbonization reactions when the carbonaceous feedstock material is heated.

Example 10

The method of any one of Examples 1-5, wherein applying an amount of a catalyst comprises phosphoric acid and recovered ash.

Example 11

The method of Example 10, wherein a maximum temperature for heating the carbonaceous feedstock material and the phosphorus and recovered ash is 650 C.

Example 14

The method of any one of Examples 1-5, wherein applying an amount of a catalyst comprises: applying a solution of Fe(NO3)3 to the carbonaceous feedstock material.

Example 15

The method of Example 14, wherein the carbonaceous feedstock material is heated to over 900 C.

Example 16

The method of any one of Examples 14-15, wherein the Fe(NO3)3 biases carbon structures of the carbonaceous feedstock material from an amorphous sp3 structures to a graphitic sp2 structures.

Example 17

The method of any one of Examples 14-16, wherein the generated biochar material has a ratio of at least 4:1 sp2 structures to sp3 structures.

Example 18

The method of any one of Examples 14-17, recovering an amount of the catalyst from the generated biochar material by washing the generated biochar material with water.

Example 19

The method of any one of Examples 14-18, wherein the catalyst is recovered biomass ash including rare earth and alkaline metals and their oxides.

Example 20

The method of any one of Examples 1-19, wherein the carbonaceous feedstock material is any one of wood, corn stover, rice straw or nut hulls.

Example 21

The method of any one of the prior examples wherein the method results in carbon materials (i.e., the generated biochar material) with a more homogeneous and pure carbon structure than untreated materials as measured by X-ray Photon Spectroscopy (XPS), Nuclear Magnetic Resonance (NMR), Solid-State Cross-Polarization Magic Angle Spinning Carbon-13 Nuclear Magnetic Resonance (CP/MAS 13C-NMR), or optical anisotropy.

Example 22

The method of any one of the prior examples wherein the elemental analysis for determination of Oxygen-to-Carbon (O:C) or Hydrogen-to-Carbon (H:C) elemental ratios results in lower O:C or H:C elemental ratios versus untreated materials, and therefore greater carbon stability in the environment.

Example 23

The method of any one of the prior examples wherein biomass carbons have a range of elemental compositions with molar O:C ratios from 0.54:1 to 0.71:1 and molar H:C ratios from 1.32:1 to 1.66:1.

Example 24

The method of any of the prior examples wherein the pyrolysis of untreated carbonaceous feedstock material results in molar O:C ratios from 0.16:1 to 0.6:1 and molar H:C ratios from 0.3:1 to 1.5:1, with lower ratios the results of higher heating temperatures.

Example 25

The method of any of the prior examples, wherein the use of phosphoric acid reduces the range of molar O:C ratios to 0.02:1 to 0.39:1 and molar H:C ratios from 0.25:1 to 0.9:1 with lower ratios with the results of higher heating temperatures. At 200 C H:C ratios are reduced by 21-42%, at 400 C they are reduced 46-52%, and at 600 C they are reduced to 20-50%. At 200 C O:C ratios are reduced by 22-37%, at 400 C they are reduced 37-62%, and at 600 C they are reduced 67-89% to trace levels.

Example 26

The method of any one of the prior examples wherein applying an amount of a catalyst comprises applying an amount of transition metal, phosphoric acid and recovered ash.

Example 27

The method of any one of Examples 14-17 wherein the exfoliation of the biochar material may produce a graphitic nanoplatelet, with between 1-10 discernible carbon layers, a particle thickness between 0.335-3.400 nm, and lateral dimensions from 50-1000 nm.

Example 28

The method of any one of Examples 1-9, wherein phosphoric acid is used in conjunction with iron nitrate to lowers or reduce the temperature and an energy threshold for carbonization reactions when the carbonaceous feedstock material is heated, as well as increasing the solid yield of pyrolysis products (e.g., biochar).

Example 29

The method of any one of Examples 14-17, wherein the pyrolysis temperature is greater than 900 C and use of phosphoric acid in conjunction with iron nitrate increases the yield of graphitic nanoplatelets from 5% to 10%.

Example 30

The method of any one of Examples 14-17 where the ratio of iron to carbonaceous feedstock material is 1:20 and the feedstock is heated to a temperature of 900 C, producing a graphic carbon with a 6.12:1 ratio of sp2:sp3 carbons, with 9% C—O functional groups and 7% carboxyl functional groups. Raman spectroscopy of the exfoliated graphitic nanoplatelets gives a 2D:G ratio of 0.25:1 or greater.

Example 31

The method of any one of Examples 14-17 where the fineness of the product carbon (i.e., the generated biochar material) is increased by a factor of 10 or more after a grinding or milling process.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method of converting a carbonaceous feedstock material into a solid carbon product, the method comprising:
   receiving an amount of a carbonaceous feedstock material;
   applying an amount of a liquid catalyst solution to the carbonaceous feedstock material, the liquid catalyst solution comprising a transition metal salt and water, the transition metal salt selected from the group consisting of $Fe(NO_3)_3$, $Fe(NO_3)_2$ and $FeCl_3$;
   soaking the feedstock material in the liquid catalyst solution for a period of time allowing the feedstock material to absorb iron ions into the feedstock material, wherein the mass of transition metal in the liquid catalyst solution is less than a mass of the feedstock material;
   heating the carbonaceous feedstock material and the applied liquid catalyst solution in an anaerobic environment to a temperature of at least 300 C; and
   generating a graphitic biochar material, wherein the graphitic biochar material comprises an amount of added iron (Fe) from the transition metal salt;
   applying an amount of acid to the graphitic biochar material; and
   recovering an amount of the catalyst from the graphitic biochar material, wherein the catalyst $FeCl_3$ is recovered where the applied amount of acid is hydrochloric acid, and wherein the catalyst $Fe(NO_3)_3$ and/or $Fe(NO_3)_2$ is recovered where the applied acid is nitric acid.

2. The method of claim 1 wherein the $Fe(NO_3)_3$ biases carbon structures of the carbonaceous feedstock material from an sp3 structures to graphitic sp2 structures.

3. The method of claim 2, wherein the generated graphitic biochar material has carbon bond structure with a ratio of at least 4:1 sp2 structures to sp3 structures.

4. The method of claim 1, wherein the anaerobic environment comprises a positive pressure reactor.

5. The method of claim 1, wherein the carbonaceous feedstock material is received onto a conveyor and the catalyst is applied to the carbonaceous feedstock material while moving on the conveyor.

6. The method of claim 1, further comprising:
   receiving into a container the carbonaceous feedstock material; and
   soaking the carbonaceous feedstock material with the liquid catalyst solution such that the carbonaceous feedstock material absorbs iron at a 1:n ratio for n units of feedstock material to every one unit of iron, wherein n is a value greater than 1.

7. The method of claim 1, wherein the carbonaceous feedstock material is heated to over 900 C.

8. The method of claim 1, recovering an amount of the catalyst from the generated graphitic biochar material by washing the generated biochar material with water.

9. The method of claim 1, further comprising:
   cooling the heated graphitic biochar material, and then applying the amount of acid; and
   forming turbostratic graphic carbon in the cooled graphitic biochar material;
   recovering an amount of $Fe(NO_3)_3$ from the turbostratic graphitic carbon in the cooled graphitic biochar material by the applying nitric acid.

10. The method of claim 1, further comprising:
    cooling the heated graphitic biochar material, and then applying the amount of acid; and
    forming turbostratic graphic carbon in the cooled graphitic biochar material;
    recovering an amount of $FeCl_3$ from the turbostratic graphitic carbon in the cooled graphitic biochar material by applying the hydrochloric acid.

11. The method of claim 1, wherein the carbonaceous feedstock material is any one of wood, corn stover, rice straw or nut hulls.

* * * * *